United States Patent
Cho et al.

(10) Patent No.: US 10,762,899 B2
(45) Date of Patent: Sep. 1, 2020

(54) SPEECH RECOGNITION METHOD AND APPARATUS BASED ON SPEAKER RECOGNITION

(71) Applicant: Samsung Electronics Co., Ltd., Suwon-si, Gyeonggi-do (KR)

(72) Inventors: Keun-seok Cho, Suwon-si (KR); Dong-hoon Ahn, Seoul (KR); Chi-youn Park, Suwon-si (KR); Young-ho Han, Yongin-si (KR); Jae-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/688,136

(22) Filed: Aug. 28, 2017

(65) Prior Publication Data
US 2018/0061412 A1    Mar. 1, 2018

(30) Foreign Application Priority Data
Aug. 31, 2016    (KR) .................. 10-2016-0111690

(51) Int. Cl.
*G10L 15/22*    (2006.01)
*G10L 17/08*    (2013.01)
(Continued)

(52) U.S. Cl.
CPC .............. *G10L 15/22* (2013.01); *G06F 3/167* (2013.01); *G10L 15/08* (2013.01); *G10L 17/005* (2013.01);
(Continued)

(58) Field of Classification Search
CPC ....... G06F 17/289; G10L 15/20; G10L 15/16; G10L 15/265; G10L 15/08; G10L 15/187;
(Continued)

(56) References Cited

U.S. PATENT DOCUMENTS 4,227,046 A * 10/1980 Nakajima ............... G10L 15/20
381/94.1
4,837,830 A *  6/1989 Wrench, Jr. ............. G10L 17/00
704/238

(Continued)

FOREIGN PATENT DOCUMENTS

| KR | 10-2010-0027865 A | 3/2010 |
| KR | 10-2013-0133629 A | 12/2013 |
| WO | 2016/133316 A1 | 8/2016 |

OTHER PUBLICATIONS

Partial European Search Report dated Jun. 28, 2019, issued in European Application No. 17846916.9.
(Continued)

*Primary Examiner* — Neeraj Sharma
(74) *Attorney, Agent, or Firm* — Jefferson IP Law, LLP

(57) ABSTRACT

A speech recognition method and an apparatus which recognize speech, based on speaker recognition, and output a result of the speech recognition are provided. The speech recognition method includes activating a session for receiving an input of an audio signal, performing speech recognition on a speech signal detected from the input audio signal while the session is maintained, determining whether a speaker of the speech signal is a registered speaker based on speaker information generated from the speech signal, determining whether to maintain the session based on a result of the determination, and outputting a result of performing the speech recognition.

21 Claims, 26 Drawing Sheets

(51) Int. Cl.
  *G10L 25/78* (2013.01)
  *G06F 3/16* (2006.01)
  *G10L 15/08* (2006.01)
  *G10L 17/00* (2013.01)
  *G10L 17/26* (2013.01)

(52) U.S. Cl.
  CPC .............. *G10L 17/08* (2013.01); *G10L 17/26* (2013.01); *G10L 25/78* (2013.01); *G10L 2015/227* (2013.01)

(58) Field of Classification Search
  CPC ......... G10L 15/22; G10L 15/30; G10L 19/12; G10L 17/005; G10L 13/08; G10L 25/93; H05K 999/99
  See application file for complete search history.

(56) References Cited

U.S. PATENT DOCUMENTS

| | | | | |
|---|---|---|---|---|
| 6,073,101 | A * | 6/2000 | Maes | G10L 15/065 704/231 |
| 6,144,938 | A * | 11/2000 | Surace | G10L 13/033 704/257 |
| 6,151,575 | A * | 11/2000 | Newman | G10L 15/07 704/231 |
| 6,757,362 | B1 * | 6/2004 | Cooper | H04M 3/527 379/88.01 |
| 7,899,675 | B1 * | 3/2011 | Fitzpatrick | G10L 15/26 704/270.1 |
| 8,234,494 | B1 * | 7/2012 | Bansal | G10L 17/24 713/176 |
| 9,117,449 | B2 | 8/2015 | Newman et al. | |
| 9,558,749 | B1 * | 1/2017 | Secker-Walker | G10L 17/02 |
| 9,799,336 | B2 * | 10/2017 | Dzik | G10L 15/26 |
| 9,812,130 | B1 * | 11/2017 | Corfield | G10L 15/183 |
| 9,870,785 | B2 * | 1/2018 | Bradley | G10L 25/90 |
| 2003/0074201 | A1 * | 4/2003 | Grashey | G10L 17/22 704/273 |
| 2005/0033573 | A1 * | 2/2005 | Hong | G10L 15/063 704/250 |
| 2005/0033582 | A1 * | 2/2005 | Gadd | G06Q 30/02 704/277 |
| 2006/0248019 | A1 * | 11/2006 | Rajakumar | G06Q 20/382 705/64 |
| 2007/0203699 | A1 * | 8/2007 | Nagashima | G10L 15/22 704/241 |
| 2008/0255842 | A1 * | 10/2008 | Simhi | G10L 25/78 704/246 |
| 2012/0084087 | A1 * | 4/2012 | Yang | G10L 17/00 704/246 |
| 2012/0197629 | A1 * | 8/2012 | Nakamura | G06F 17/289 704/3 |
| 2012/0245941 | A1 * | 9/2012 | Cheyer | G06F 21/32 704/246 |
| 2013/0144619 | A1 * | 6/2013 | Lord | G06F 3/165 704/235 |
| 2013/0144623 | A1 * | 6/2013 | Lord | G09B 21/006 704/249 |
| 2014/0088965 | A1 * | 3/2014 | Goel | H04M 3/42348 704/246 |
| 2014/0163978 | A1 * | 6/2014 | Basye | G10L 15/28 704/233 |
| 2014/0358535 | A1 | 12/2014 | Lee et al. | |
| 2015/0025888 | A1 * | 1/2015 | Sharp | G10L 17/00 704/246 |
| 2015/0058017 | A1 * | 2/2015 | Singh | G06F 21/10 704/249 |
| 2015/0112684 | A1 * | 4/2015 | Scheffer | G10L 17/14 704/257 |
| 2015/0170674 | A1 * | 6/2015 | Ishibashi | G10L 25/48 704/270 |
| 2016/0104475 | A1 * | 4/2016 | Tachibana | G10L 13/06 704/10 |
| 2016/0217793 | A1 * | 7/2016 | Gorodetski | G10L 17/04 |
| 2016/0232893 | A1 * | 8/2016 | Subhojit | G10L 15/07 |
| 2016/0240194 | A1 | 8/2016 | Lee et al. | |
| 2017/0069327 | A1 * | 3/2017 | Heigold | G10L 17/18 |
| 2017/0140761 | A1 * | 5/2017 | Secker-Walker | G10L 17/06 |
| 2017/0148442 | A1 * | 5/2017 | Nishikawa | G10L 15/285 |
| 2017/0162198 | A1 | 6/2017 | Chakladar et al. | |
| 2017/0287490 | A1 * | 10/2017 | Biswal | G10L 17/20 |
| 2018/0032526 | A1 * | 2/2018 | Cudak | G06F 17/3053 |

OTHER PUBLICATIONS

Extended European Search Report dated Sep. 26, 2019, issued in European Application No. 17846916.9.
Mohamed Faouzi Benzeghiba et al: "On the combination of speech and speaker recognition", XP007007212, Sep. 1, 2003.
Lei Yun et al:"A novel scheme for speaker recognition using a phonetically-aware deep neural network", XP032617660, May 4, 2014.
Faundez-Zanuy M et al: "State-of-the-art in speaker recognition". XP011290936, May 1, 2005.
Douglas Reynolds et al: "Beyond Cepstra: Exploiting High-Level Information in Speaker Recognition", XP055623961, Jan. 1, 2003.

* cited by examiner

SPEECH RECOGNITION METHOD AND APPARATUS BASED ON SPEAKER RECOGNITION

CROSS-REFERENCE TO RELATED APPLICATION(S)

This application claims the benefit under 35 U.S.C. § 119(a) of a Korean patent application filed on Aug. 31, 2016 in the Korean Intellectual Property Office and assigned Serial number 10-2016-0111690, the entire disclosure of which is hereby incorporated by reference.

TECHNICAL FIELD

The present disclosure relates to a speech recognition method and apparatus. More particularly, the present disclosure relates to a method and apparatus for recognizing speech based on speaker recognition, and outputting a result of the speech recognition when the speech is recognized in a speech recognition system.

BACKGROUND

Recently, since electronic devices such as smartphones that perform various functions have been developed, electronic devices having a speech recognition function embedded therein to improve manipulability have been released. The speech recognition function is advantageous in recognizing speech of a user without separate manipulation of a button or contact via a touch module, thereby allowing the user to easily control a device.

Due to the speech recognition function, the user may execute a call function or write a text message without inputting separate buttons of a portable terminal such as a smartphone, and may easily set various functions such as navigation, internet search, alarm setting, or the like.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide a speech recognition method and apparatus that determine whether to maintain a session, based on speaker recognition, thereby allowing sequential speech recognitions without an operation of separately activating the session upon utterance of a registered speaker.

Another aspect of the present disclosure is to provide a speech recognition method and apparatus that output a result of performing speech recognition only on utterance of a registered speaker, based on speaker recognition, thereby providing a personalized speech recognition service to a user of the speech recognition apparatus.

In accordance with another aspect of the present disclosure, a method of speech recognition is provided. The method includes activating a session for receiving an input of an audio signal, performing speech recognition on a speech signal detected from the input audio signal while the session is maintained, determining whether a speaker of the speech signal is a registered speaker based on speaker information generated from the speech signal, determining whether to maintain the session based on a result of the determination of whether the speaker of the speech signal is a registered speaker, and outputting a result of the speech recognition.

In accordance with another aspect of the present disclosure, an apparatus for speech recognition is provided. The apparatus includes a receiver configured to receive an input audio signal while a session for receiving an input of one or more audio signals is maintained, a processor configured to detect a speech signal from the input audio signal, perform speech recognition on the speech signal, determine whether a speaker of the speech signal is a registered speaker based on speaker information generated from the speech signal, and determine whether to maintain the session based on a result of the determination of whether the speaker of the speech signal is a registered speaker, and an output unit configured to output a result of the speech recognition.

In accordance with another aspect of the present disclosure, a server for speech recognition is provided. The server includes a receiver configured to receive an input audio signal from a speech recognition apparatus, the input audio signal being received by the receiver while a session for receiving an input of one or more audio signals is maintained, a processor configured to detect a speech signal from the input audio signal, perform speech recognition on the speech signal, determine whether a speaker of the speech signal is a registered speaker based on speaker information generated from the speech signal, and determine whether to maintain the session of the speech recognition apparatus based on a result of the determination of whether the speaker of the speech signal is a registered speaker, and an output unit configured to transmit, to the speech recognition apparatus, a session management signal for determining whether to maintain the session and a result of the speech recognition.

In accordance with another aspect of the present disclosure, a non-transitory, computer-readable recording medium is provided having recorded thereon at least one program including instructions that, when executed by at least one processor, configure the at least one processor to execute a speech recognition method. The speech recognition method includes activating a session for receiving an input of an audio signal, performing speech recognition on a speech signal detected from the input audio signal while the session is maintained, determining whether a speaker of the speech signal is a registered speaker based on speaker information generated from the speech signal, determining whether to maintain the session based on a result of the determination of whether the speaker of the speech signal is a registered speaker, and outputting a result of the speech recognition.

In accordance with another aspect of the present disclosure, a system for speech recognition is provided. The system includes a plurality of speech recognition apparatuses and a speech recognition server for controlling the plurality of speech recognition apparatuses, wherein a first speech recognition apparatus from among the plurality of speech recognition apparatuses is configured to receive an input audio signal while a session for receiving an input of one or more audio signals is maintained, and transmit the input audio signal to the speech recognition server, and wherein the speech recognition server is configured to detect a speech signal from the input audio signal, perform speech recognition on the speech signal, and determine whether a speaker of the speech signal is a registered speaker, based on speaker information generated from the speech signal, and control, when the speaker of the speech signal is the registered speaker, the plurality of speech recognition apparatuses to maintain sessions of the plurality of speech recognition apparatuses during a preset period.

In accordance with another aspect of the present disclosure, a method of speech recognition is provided. The method includes activating a session for receiving an input of an audio signal, performing speech recognition on a plurality of speech signals detected from the input audio signal while the session is maintained, determining whether at least one speaker of the plurality of speech signals is a registered speaker based on speaker information generated from the plurality of speech signals, determining whether to maintain the session based on a result of the determination of whether the at least one speaker is a registered speaker, and outputting a result of the speech recognition.

In accordance with another aspect of the present disclosure, an apparatus for speech recognition is provided. The apparatus includes a receiver to receive an input audio signal while a session for receiving an input of one or more audio signals is maintained, a processor to perform speech recognition on a plurality of speech signals detected from the input audio signal while the session is maintained, determine whether at least one speaker of the plurality of speech signals is a registered speaker based on speaker information generated from the plurality of speech signals, and determine whether to maintain the session based on a result of the determination of whether the at least one speaker is a registered speaker, and an output unit configured to output a result of the speech recognition.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
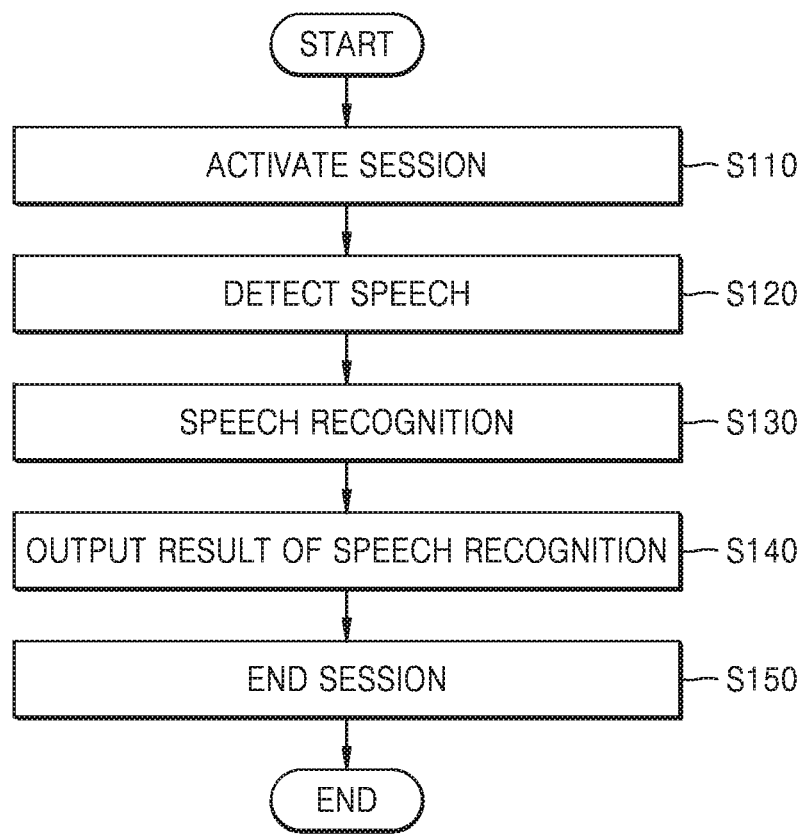
FIG. 1 is a flowchart of a general speech recognition method according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will also be understood that when an element is referred to as being "connected to" or "coupled with" another element, it can be directly connected to or coupled with the other element, or it can be electrically connected to or coupled with the other element by having an intervening element interposed therebetween.

Also, when a part "includes" or "comprises" an element, unless there is a particular description contrary thereto, the part can further include other elements, not excluding the other elements.

Throughout the specification, expressions such as "in some embodiments", "in an embodiment", or the like, do not necessarily indicate a same embodiment.

Some embodiments may be described in terms of functional block components and various processing operations. Some or all of the functional blocks may be realized by any number of hardware and/or software components configured to perform the specified functions. For example, functional blocks of the present disclosure may be realized by one or more microprocessors, or circuit components for a predetermined function. In addition, for example, the functional blocks of the present disclosure may be implemented using any programming or scripting language. The functional blocks may also be implemented using algorithms that execute on one or more processors. Furthermore, the present disclosure could employ any number of techniques for electronics configuration, signal processing and/or control, data processing and the like, according to the related art. The terms such as "module" and "configuration" may be used broadly and are not limited to mechanical and/or physical embodiments.

Furthermore, connecting lines or connectors between elements shown in drawings are intended to represent functional relationships and/or physical or logical couplings between the elements. It should be noted that many alternative or additional functional relationships, physical connections or logical connections may be present in a practical device.

As used herein, the term "and/or" includes any and all combinations of one or more of the associated listed items. Expressions such as "at least one of," when preceding a list of elements, modify the entire list of elements and do not modify the individual elements of the list.

Hereinafter, the present disclosure will now be described more fully with reference to the accompanying drawings.

FIG. 1 is a flowchart of a general speech recognition method according to an embodiment of the present disclosure.

Referring to FIG. 1, in operation S110, a general speech recognition system may activate a session for receiving an input of an audio signal. The speech recognition system may activate the session based on a user input (e.g., an input of pressing, by a user, a physical start button, or an input of uttering a preset activation keyword).

In operation S120, the general speech recognition system may detect a speech signal from the input audio signal while the session is activated. In operation S130, the general speech recognition system may perform speech recognition on the detected speech signal. When the session is activated and then the speech signal is detected from the input audio signal, the general speech recognition system may output a result of the speech recognition in operation S140, regardless of a speaker who uttered the speech, and may end the session in operation S150.

The general speech recognition system ends the session by extracting, by using a speech detection algorithm, a point of time when the speech ends so that the general speech recognition system may end a session after each utterance. A reason why the general speech recognition system ends a session after each utterance is to perform speech recognition only on utterance for the speech recognition. If the general speech recognition system does not end the session even after the utterance is ended, the speech recognition may be performed on utterance not for the speech recognition or on noise.

A user of the general speech recognition system has to perform an operation of activating a session so as to allow speech recognition to be performed on another utterance after the speech recognition is performed on the utterance. The user has to utter speech after the session is activated. When the session is activated again, the general speech recognition system may repeatedly perform operations S120 through S150 of FIG. 1.

Thus, in order for the general speech recognition system to perform the speech recognition only on utterance that is a speech recognition target, the general speech recognition system has to activate a session before the utterance that is the speech recognition target is started, and end the session when the utterance that is the speech recognition target is ended. Therefore, in order to allow the general speech recognition system to sequentially perform the speech recognition, the user has the inconvenience of performing an operation of activating a session before every utterance. In addition, because the general speech recognition system outputs a speech recognition result regardless of a speaker, the general speech recognition system cannot perform personalized speech recognition. Thus, the general speech recognition system has a problem in that, when a particular speaker utters or after the particular speaker utters, a result of speech recognition that is also performed on content of utterance of another speaker is output.

As described above, a general speech recognition system cannot sequentially perform speech recognition if the user does not perform an operation of activating a session for every utterance. Thus, the user has the inconvenience of performing the operation of activating a session for every utterance. In addition, a general speech recognition system may result in an error in a process of recognizing a session activation operation performed by the user. In the case where a general speech recognition system activates a session when a preset activation keyword is uttered, a decision of whether to drive the speech recognition system is affected according to a function of the general speech recognition system in recognizing the activation keyword.

In order to solve these problems, it is possible to use a speech recognition system that does not instantly end a session after speech recognition is performed, but maintains the session. However, when the speech recognition system maintains the session, it is difficult for the speech recognition system to distinguish an input audio signal as utterance for a speech recognition target from noise that is not the speech recognition target, so that a speech recognition performance deteriorates. For example, when a plurality of speakers talk, the speech recognition system may perform speech recognition even on utterance of a speaker that is not the speech recognition target, so that the speech recognition performance deteriorates. In addition, when noise constantly occurs, the speech recognition system may determine utterance is continued without an end and may then constantly perform the speech recognition on the noise. If the speech recognition system repeatedly performs a speech detection operation and a speech recognition operation, the speech recognition system may also unnecessarily consume power or memory capacity.

An embodiment for solving the problem of the speech recognition system that performs the speech recognition method of FIG. 1 may provide a speech recognition system that performs speech recognition based on speaker recognition. The speech recognition system according to an embodiment may initially activate a session, and even after utterance is ended, and the speech recognition system may sequentially perform speech recognition for a next utterance, without an additional operation of activating a session. In addition, the speech recognition system according to an embodiment may simultaneously perform speaker verification of verifying whether a speaker of an input utterance is a registered speaker and speech recognition on the input utterance, so that the speech recognition system may output only a result of the speech recognition with respect to an utterance of the registered speaker. Therefore, the speech recognition system according to an embodiment may allow personalized speech recognition.

In addition, by performing the speech recognition based on the speaker recognition, the speech recognition system according to an embodiment may maintain a speech recognition session when the speaker of the input utterance is the registered speaker. Thus, the speech recognition system according to an embodiment may solve a problem of the speech recognition system that performs the speech recognition method of FIG. 1, including the problem being caused by repeatedly activating a session, and may provide a convenient usage environment to the user.

FIGS. 2A, 2B, 2C, and 2D illustrate a speech recognition system according to various embodiments of the present disclosure.

Figure 2A:
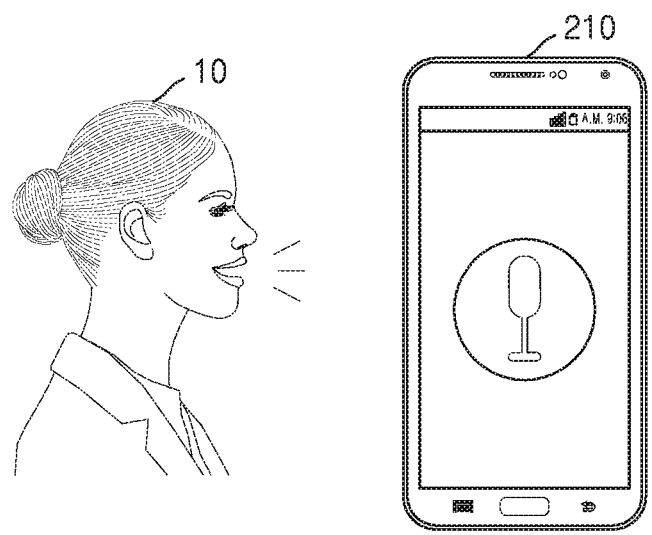
FIGS. 2A, 2B, 2C, and 2D illustrate a speech recognition system according to various embodiments of the present disclosure.

Referring to FIG. 2A, a speech recognition system according to an embodiment may include a speech recognition apparatus 210. For example, the speech recognition apparatus 210 may include, but is not limited to, a smartphone, a tablet personal computer (tablet PC), a PC, a smart television (smart TV), a mobile phone, a personal digital assistant (PDA), a laptop, a media player, a micro server, a global positioning system (GPS) device, an electronic book terminal, a digital broadcasting terminal, a navigation device, a kiosk, a Moving Picture Experts Group (MPEG-1 or MPEG-2) audio layer-3 (MP3) player, a digital camera, and mobile or non-mobile computing apparatuses. The speech recognition apparatus 210 according to the present embodiment may activate a session, may receive an input of an audio signal including a speech signal uttered by a speaker 10, and may perform speech recognition on the speech signal. The speech recognition apparatus 210 may then output a result of the speech recognition.

Figure 2B:
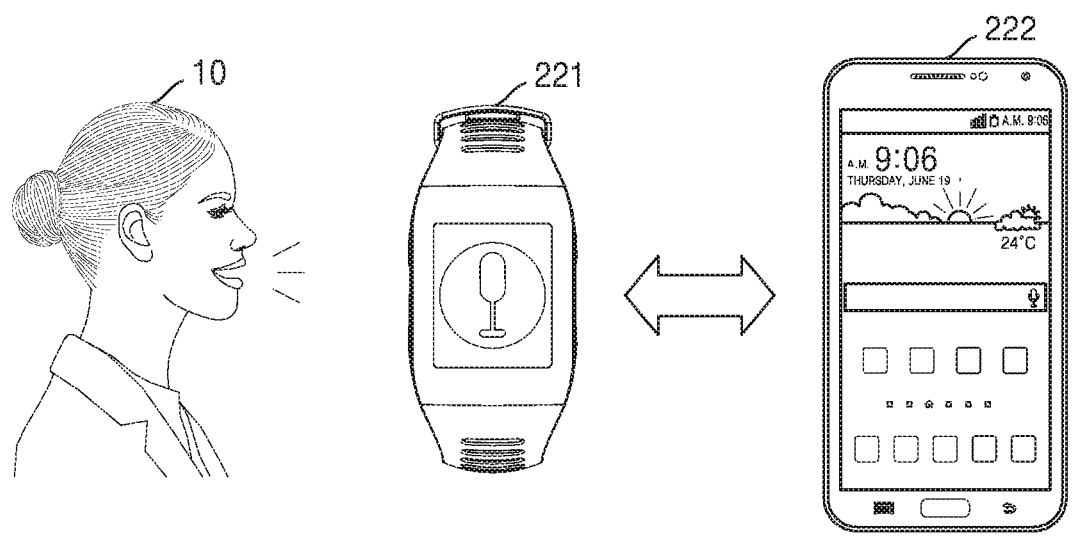

Referring to FIG. 2B, a speech recognition system according to an embodiment may include a first speech recognition apparatus 221 and a second speech recognition apparatus 222. The first speech recognition apparatus 221 and the second speech recognition apparatus 222 may be connected to each other in a wired or wireless manner. For example, the second speech recognition apparatus 222 may include a mobile computing apparatus such as a smartphone, a tablet PC, a PC, a smart TV, or the like, and the first speech recognition apparatus 221 may include a wearable device, a smartphone, a tablet PC, a PC, or a smart TV which interoperates with the second speech recognition apparatus 222, but the present disclosure is not limited thereto.

The second speech recognition apparatus 222 according to an embodiment may control an operation of the first speech recognition apparatus 221 and may share data with the first speech recognition apparatus 221. The second speech recognition apparatus 222 according to an embodiment may also transmit a control signal to the first speech recognition apparatus 221 to activate a session of the first speech recognition apparatus 221 to receive an input of an audio signal.

The first speech recognition apparatus 221 may receive the input of the audio signal including the speech signal uttered by the speaker 10, and may transmit the input audio signal to the second speech recognition apparatus 222. Alternatively, the first speech recognition apparatus 221 may receive the input of the audio signal including the speech signal uttered by the speaker 10, and may transmit the speech signal detected from the input audio signal to the second speech recognition apparatus 222. Alternatively, the first speech recognition apparatus 221 may receive the input of the audio signal including the speech signal uttered by the speaker 10, and may transmit a characteristic of the speech signal detected from the input audio signal to the second speech recognition apparatus 222.

The second speech recognition apparatus 222 may perform speech recognition based on a signal received from the first speech recognition apparatus 221. For example, the second speech recognition apparatus 222 may perform the speech recognition on the speech signal detected from the audio signal received from the first speech recognition apparatus 221. The second speech recognition apparatus 222 may then output a result of the speech recognition or may control the first speech recognition apparatus 221 to output the result of the speech recognition.

Figure 2C:
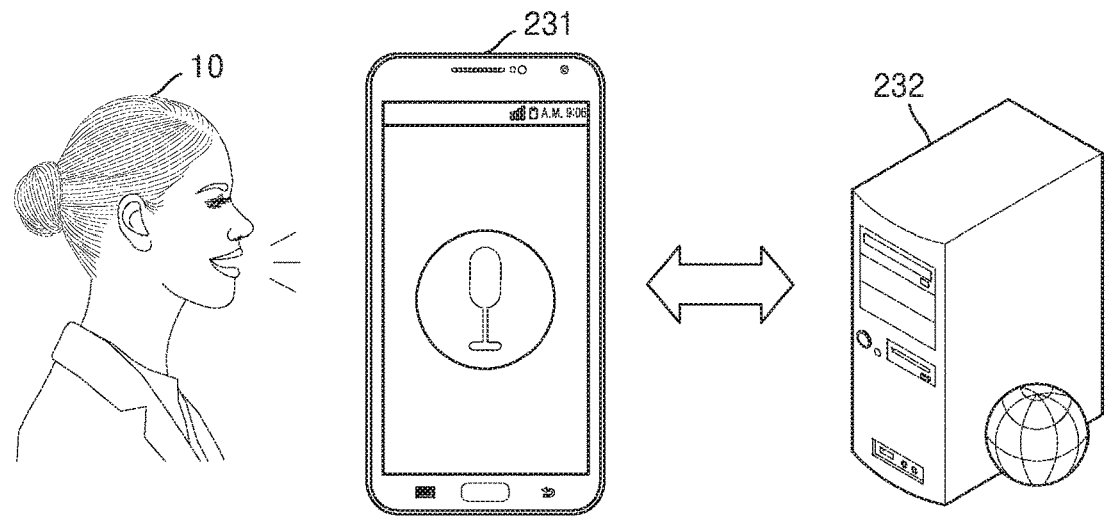

Referring to FIG. 2C, a speech recognition system according to an embodiment may include a speech recognition apparatus 231 and a speech recognition server 232. The speech recognition apparatus 231 and the speech recognition server 232 may be connected to each other in a wired or wireless manner.

The speech recognition server 232 according to an embodiment may share data with the speech recognition apparatus 231. The speech recognition apparatus 231 may activate a session, and may receive an input of an audio signal including a speech signal uttered by the speaker 10. The speech recognition apparatus 231 may transmit the input audio signal to the speech recognition server 232. Alternatively, the speech recognition apparatus 231 may transmit the speech signal detected from the input audio signal to the speech recognition server 232. Alternatively, the speech recognition apparatus 231 may transmit a characteristic of the speech signal detected from the input audio signal to the speech recognition server 232.

The speech recognition server 232 may perform speech recognition based on a signal received from the speech recognition apparatus 231. For example, the speech recognition server 232 may perform the speech recognition on the speech signal detected from the audio signal received from the speech recognition apparatus 231. The speech recognition server 232 may also transmit a result of the speech recognition to the speech recognition apparatus 231. The speech recognition apparatus 231 may then output the result of the speech recognition.

Figure 2D:
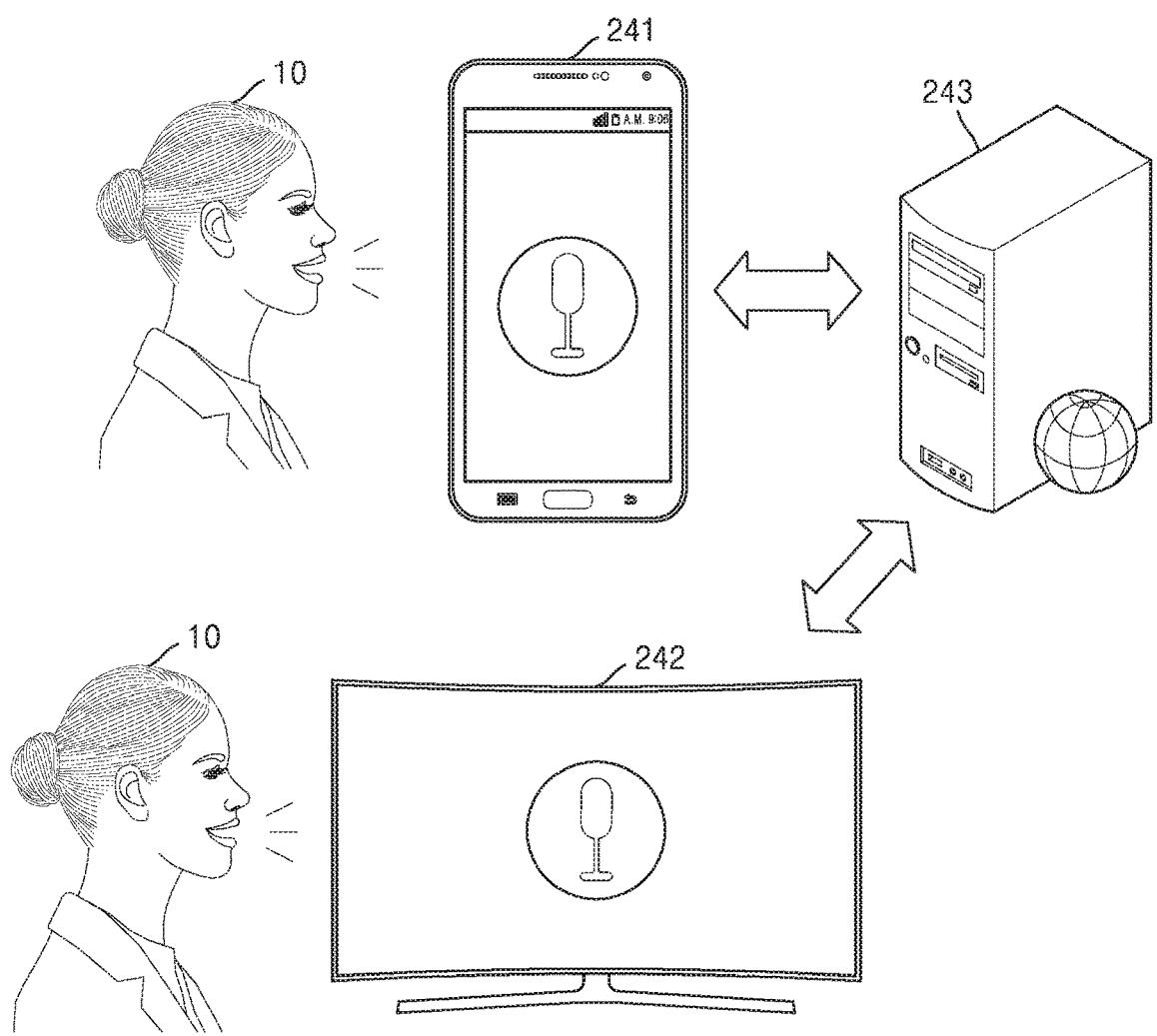

Referring to FIG. 2D, a speech recognition system according to an embodiment may include a first speech recognition apparatus 241, a second speech recognition apparatus 242, and a speech recognition server 243. The first speech recognition apparatus 241, the second speech recognition apparatus 242, and the speech recognition server 243 may be connected to each other in a wired or wireless manner. At least one of the first speech recognition apparatus 241 and the second speech recognition apparatus 242 may be a mobile computing device such as a smartphone, or may be an electronic product included in a home network system.

The first speech recognition apparatus 241 and the second speech recognition apparatus 242 may be controlled in a remote manner via the speech recognition server 243, or may share data with each other. In more detail, the speech recognition server 243 may determine at least one of an activation, a maintenance, and an end of a session of the first speech recognition apparatus 241 and/or the second speech recognition apparatus 242, and may perform speech recognition on an audio signal received by the first speech recognition apparatus 241 and/or the second speech recognition apparatus 242.

For example, the first speech recognition apparatus 241 according to an embodiment may activate a session, and may receive an input of an audio signal including a speech signal uttered by the speaker 10. The first speech recognition apparatus 241 may transmit information about the input audio signal to the speech recognition server 243. The information about the input audio signal may be the input audio signal, the speech signal detected from the input audio signal, and/or a characteristic of the speech signal detected from the input audio signal.

The speech recognition server 243 may perform the speech recognition based on the information about the input audio signal received from the first speech recognition apparatus 241. The speech recognition server 243 may transmit a result of the speech recognition to at least one of the first speech recognition apparatus 241 and the second speech recognition apparatus 242. The speech recognition server 243 may control at least one of the first speech recognition apparatus 241 and the second speech recognition apparatus 242 to then output the result of the speech recognition.

As illustrated in FIGS. 2A, 2B, 2C, and 2D, the speech recognition system according to embodiments may include at least one speech recognition apparatus and may further include a speech recognition server. Hereinafter, for convenience of description, a speech recognition method performed by the "speech recognition apparatus" will be described. However, hereinafter, some or all of operations of the speech recognition apparatus which are described below may be performed by the speech recognition server, or may be partially performed by a plurality of speech recognition apparatuses.

Figure 3A:
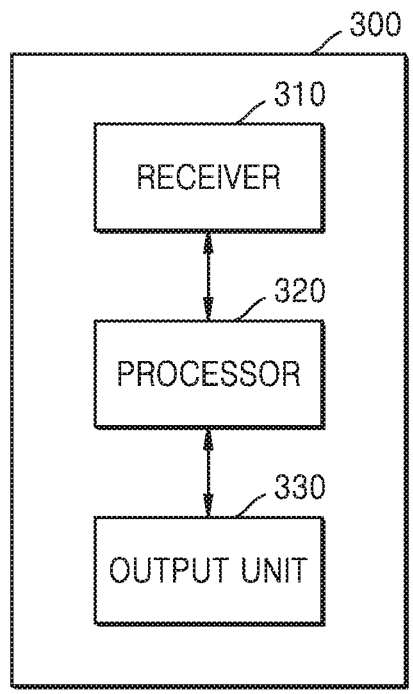
FIGS. 3A and 3B are block diagrams of a speech recognition apparatus according to various embodiments of the present disclosure.
Figure 3B:
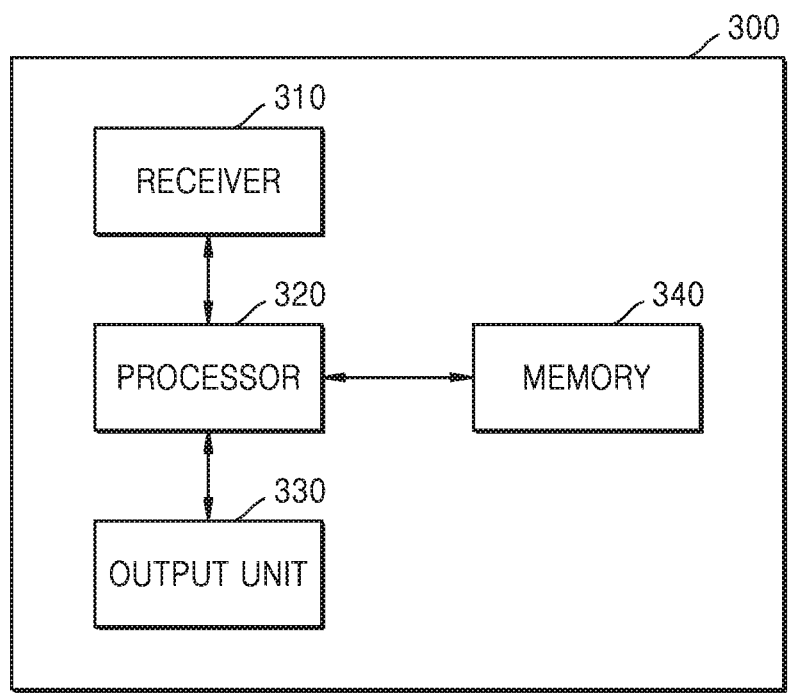

FIGS. 3A and 3B are block diagrams of a speech recognition apparatus according to various embodiments of the present disclosure.

Referring to FIG. 3A, a speech recognition apparatus 300 according to an embodiment may include a receiver 310, a processor 320, and an output unit 330. However, the speech recognition apparatus 300 may be embodied with more elements than the elements shown in FIG. 3A. For example, as illustrated in FIG. 3B, a speech recognition apparatus 300 according to an embodiment may further include a memory 340.

For example, the speech recognition apparatus 300 according to an embodiment may be embodied to be included in at least one of an electronic product, a mobile computing device, and a server, or may be embodied to be connected to at least one of the electronic product, the mobile computing device, and the server in a wired or wireless manner.

The receiver 310 may receive an audio signal. For example, the receiver 310 may directly receive the audio signal by converting external sound to electrical audio data by using a microphone. Alternatively, the receiver 310 may receive an audio signal transmitted by an external device. Referring to FIG. 3, the receiver 310 is included in the speech recognition apparatus 300, but the receiver 310 according to another embodiment may be included in a separate device and may be connected to the speech recognition apparatus 300 in a wired or wireless manner.

The receiver 310 may activate a session for receiving an input of the audio signal by the control of the processor 320. The session may indicate a period during which the speech recognition apparatus 300 starts an operation of receiving the input of the audio signal and then ends the operation. The activation of the session may describe that the speech recognition apparatus 300 starts the operation of receiving the input of the audio signal. While the session is maintained, the receiver 310 may transmit the input audio signal to the processor 320.

In addition, the receiver 310 may receive a user input of controlling the speech recognition apparatus 300. The receiver 310 may have a user input device including, but not limited to, a touch panel for receiving a user's touch, a button for receiving push manipulation by the user, a wheel for receiving rotation manipulation by the user, a keyboard, and a dome switch. The receiver 310 may not directly receive the user input but may receive a user input that is received by a separate user input device.

For example, the receiver 310 may receive a user input of storing a particular speaker as a registered speaker, and a user input of activating a session.

The processor 320 may detect a speech signal from the audio signal input through the receiver 310, and may perform speech recognition on the audio signal. In an embodiment, the processor 320 may extract a frequency characteristic of the speech signal from the input audio signal, and may perform the speech recognition by using one or more of an acoustic model and a language model. The frequency characteristic may indicate a distribution of frequency components of a sound input, where the frequency components are extracted by analyzing a frequency spectrum of the sound input. Thus, as illustrated in FIG. 3B, the speech recognition apparatus 300 may further include the memory 340 for storing a sound model and/or a language model.

In an embodiment, the processor 320 may generate speaker information from the speech signal. For example, the processor 320 may generate the speaker information from a frequency characteristic of the speech signal by using at least one of states posteriors extracted from the sound model, a universal background model, and total variability conversion information. The processor 320 may determine, based on the speaker information, whether a speaker of the speech signal is a registered speaker. The processor 320 may decide whether to maintain the session based on a result of the determination. In an embodiment, the memory 340 of FIG. 3B may store at least one of the states posteriors, the universal background model, the total variability conversion information, and registered speaker information.

The processor 320 may activate the session for receiving an input of the audio signal so as to perform the speech recognition. The processor 320 may also control maintenance or an end of the activated session.

For example, the processor 320 may activate the session based on the user input, and may set the session to be maintained during a preset session maintenance period and then ended after the preset session maintenance period. In the case where a speaker of the speech signal detected from the input audio signal received while the session is activated is the registered speaker, the processor 320 may reset the session to be activated during a preset extended period and then ended after the extended period.

The output unit 330 may output a result of performing the speech recognition on the speech signal. The output unit 330 may notify the user about the result of the speech recognition, or may transmit the result of the speech recognition to an external device (e.g., a smartphone, a smart TV, a smart watch, a server, and the like). For example, the output unit 330 may include a display capable of outputting an audio signal or a video signal.

Alternatively, the output unit 330 may perform an operation that corresponds to the result of performing the speech recognition. For example, the speech recognition apparatus 300 may determine a function of the speech recognition apparatus 300, the function corresponding to the result of performing the speech recognition, and may output, via the output unit 330, an execution screen in which the function is being performed. Alternatively, the speech recognition apparatus 300 may transmit, to an external server, a keyword corresponding to the result of performing the speech recognition, may receive information about the transmitted keyword from the external server, and may output the information to a screen via the output unit 330.

The block diagrams illustrated in FIGS. 3A and 3B may also be applied to a speech recognition server. The speech recognition server according to an embodiment may include a receiver that receives an input audio signal from a speech recognition apparatus. The speech recognition server may be connected to the speech recognition apparatus in a wired or wireless manner. The input audio signal received by the receiver of the speech recognition server might have been received by the speech recognition apparatus while a session for receiving an input of the audio signal is activated.

The speech recognition server may include a processor and an output unit, and may further include a memory. The processor of the speech recognition server may detect a speech signal from the input audio signal, and may perform speech recognition on the speech signal. The processor of the speech recognition server may determine whether a speaker of the speech signal is a registered speaker based on speaker information generated from the speech signal. The processor of the speech recognition server may determine whether to maintain the session of the speech recognition apparatus based on a result of the determination.

The output unit of the speech recognition server may transmit, to the speech recognition apparatus, a session management signal for determining whether to maintain the session and a result of performing the speech recognition. The speech recognition apparatus may output the result of performing the speech recognition, where the result is received from the speech recognition server.

Hereinafter, an operating method by the speech recognition apparatus 300 will now be described in detail. Each operation of a method described below may be performed by each of the aforementioned elements of the speech recognition apparatus 300. For convenience of description, it is assumed that the speech recognition apparatus 300 is a subject of the operations, but the descriptions below may also be applied to a case in which a speech recognition server is a subject of the operations.

Figure 4:
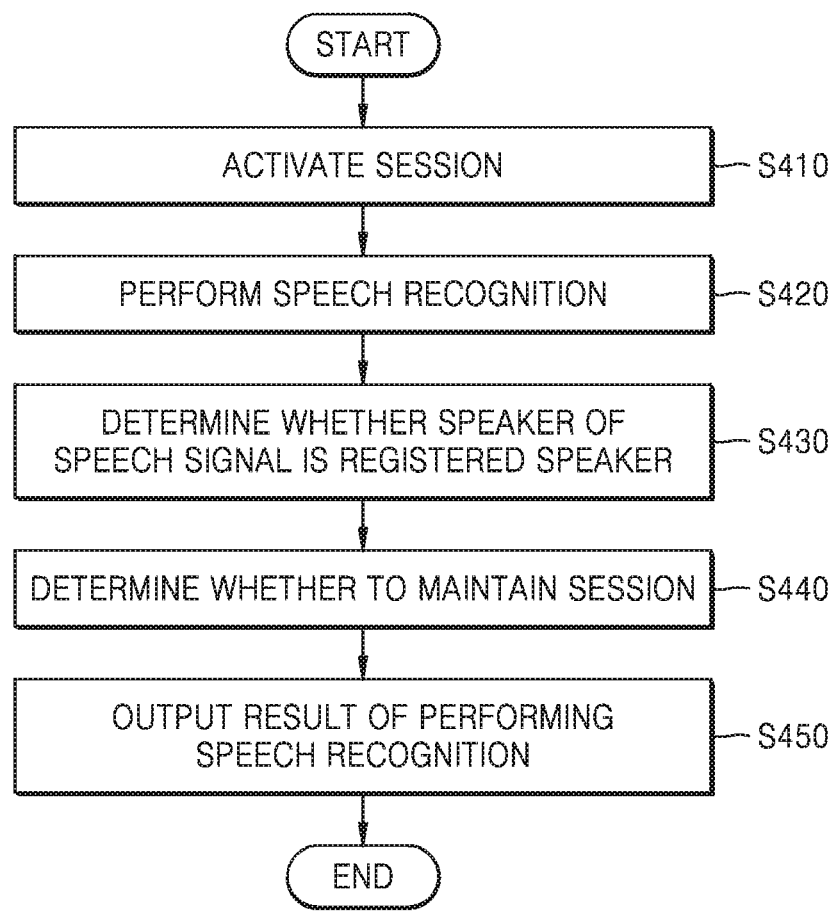
FIG. 4 is a flowchart of a speech recognition method according to an embodiment of the present disclosure.

FIG. 4 is a flowchart of a speech recognition method according to an embodiment of the present disclosure.

In operation S410, the speech recognition apparatus 300 may activate a session for receiving an input of an audio signal.

The session may indicate a period during which the speech recognition apparatus 300 starts an operation of receiving the input of the audio signal and then ends the operation. The activation of the session may describe that the speech recognition apparatus 300 starts the operation of receiving the input of the audio signal.

The speech recognition apparatus 300 may set the session to be maintained during a preset session maintenance period and then ended after the preset session maintenance period.

While the session is maintained, the speech recognition apparatus 300 may receive the input of the audio signal. In addition, while the session is maintained, the speech recognition apparatus 300 may perform the operation of receiving the input of the audio signal and may also perform an operation of processing the input audio signal. For example, while the session is maintained, the speech recognition apparatus 300 may perform at least one of operations S420 through S450 illustrated in FIG. 4.

In operation S420, the speech recognition apparatus 300 may perform speech recognition. The speech recognition apparatus 300 may detect a speech signal from the audio signal that is input while the session is maintained, and may perform the speech recognition on the detected speech signal.

In an embodiment, the speech recognition apparatus 300 may segment the audio signal that is input in real-time into frame units each having a preset length, and may process the audio signal that is segmented into the frame units. A speech signal in frame units may then be detected from the audio signal that is segmented into the frame units.

In an embodiment, the speech recognition apparatus 300 may extract, from the speech signal, a speech recognition feature vector which is for robust speech recognition, and a speaker recognition feature vector which is for robust speaker recognition. The speech recognition apparatus 300 may convert the speech signal in a time domain to a signal in a frequency domain, and may differently change frequency energy of the converted signal, thereby extracting the speech recognition feature vector and the speaker recognition feature vector.

For example, the speech recognition feature vector and the speaker recognition feature vector may be mel-frequency cepstral coefficients (MFCC) or filter bank energy, but embodiments are not limited thereto and thus, a feature vector may be extracted from a speech signal in various manners.

In an embodiment, the speech recognition apparatus 300 may perform speech recognition on the speech recognition feature vector, thereby generating a result of performing the speech recognition. The speech recognition apparatus 300 may perform the speech recognition on the speech recognition feature vector based on one or more of an acoustic model and a language model. The speech recognition apparatus 300 may perform the speech recognition, thereby extracting text assumed to have been uttered by a speaker of the speech signal.

In an embodiment, the speech recognition apparatus 300 may generate speaker information by using the speech recognition feature vector. For example, the speech recognition apparatus 300 may extract states posteriors, based on one or more of the acoustic model and the speech recognition feature vector, and may generate the speaker information by using the states posteriors and the speech recognition feature vector. In an embodiment, the speech recognition apparatus 300 may calculate a vector matrix including the speaker information by further using one or more of total variability conversion information and a universal background model in addition to the speech recognition feature vector and the states posteriors.

In an embodiment, the speech recognition apparatus 300 may simultaneously perform the speech recognition and the generation of the speaker information. In more detail, the speech recognition apparatus 300 may perform the speech recognition on the speech signal extracted by frame units in real-time and may generate the speaker information. The speech recognition apparatus 300 may perform the speech recognition on a first frame of the speech signal, and may extract states posteriors about the first frame while the speech recognition is performed on the first frame. The speech recognition apparatus 300 may then generate speaker information about the first frame by using the states posteriors about the first frame.

In an embodiment, the speech recognition apparatus 300 may repeatedly perform an operation of the speech recognition and an operation of generating speaker information on each of the frames of the speech signal which are sequentially detected from the audio signal that is input in real-time.

In operation S430, the speech recognition apparatus 300 may determine whether the speaker of the speech signal is a registered speaker. The speech recognition apparatus 300 may determine whether the speaker of the speech signal is the registered speaker based on the speaker information generated from the speech signal.

The registered speaker may be a main user of the speech recognition apparatus 300, but embodiments are not limited thereto. For example, when the speech recognition apparatus 300 is a smartphone, an owner of the smartphone may be the registered speaker. The speech recognition apparatus 300 may register a speaker based on a user input, or may store a predetermined speaker that is a default value as the registered speaker. The speech recognition apparatus 300 may store one speaker as the registered speaker or may store a plurality of speakers as registered speakers.

In an embodiment, the speech recognition apparatus 300 may store a speech characteristic of a specific speaker as registered speaker information. For example, before a session is activated, the speech recognition apparatus 300 may previously extract and store the registered speaker information from feature vectors extracted from a plurality of speech signals uttered by the specific speaker.

In an embodiment, the speech recognition apparatus 300 may calculate a similarity between the pre-stored registered speaker information and newly-generated speaker information. The speech recognition apparatus 300 may determine whether the speaker of the speech signal is the registered speaker based on a result of comparing the calculated similarity with a predetermined threshold value.

Referring to FIG. 4, operation S430 is performed after operation S420 is performed, but embodiments are not limited thereto. The operation of performing the speech recognition in operation S420 and the operation of determining whether the speaker of the speech signal is the registered speaker in operation S430 may be sequentially performed or may be simultaneously performed in a parallel manner.

In operation S440, the speech recognition apparatus 300 may determine whether to maintain the session based on a result of the determination in operation S430.

In an embodiment, the speech recognition apparatus 300 may determine whether to maintain or end the session based on whether the speaker of the speech signal is the registered speaker. The speech recognition apparatus 300 that is set to end the session after the session maintenance period elapses in operation S410 may reset the session to be further maintained when the speech recognition apparatus 300 determines that the speaker of the speech signal is the registered speaker in operation S430.

For example, when the speaker of the speech signal is the registered speaker, the speech recognition apparatus 300 may maintain the session. When the speaker of the speech signal is the registered speaker, the speech recognition apparatus 300 may set the session to be maintained during a preset extended period and then ended after the extended period.

In an embodiment, when the speaker of the speech signal is not the registered speaker, the speech recognition apparatus 300 may end the session. For example, when the speech recognition apparatus 300 determines that the speaker of the speech signal is not the registered speaker, the speech recognition apparatus 300 may instantly end the session or may set the session to be ended after the session maintenance period that is set in operation S410 elapses.

In operation S450, the speech recognition apparatus 300 may output a result of the speech recognition performed in operation S420.

When the speaker of the speech signal is the registered speaker, the speech recognition apparatus 300 may output the result of performing the speech recognition. For example, the speech recognition apparatus 300 may output text as the result of the speech recognition, the result being extracted from the speech signal by performing the speech recognition on the speech signal.

In an embodiment, in a case where speech signals are non-continuously extracted or are extracted at regular intervals while the session is maintained, the speech recognition apparatus 300 may output the text as the result of the speech recognition in a sentence unit. The result of the speech recognition which is output in a sentence unit may include text extracted from a plurality of speech signals. When a time interval between the speech signals is longer than a threshold time, the speech recognition apparatus 300 may determine that one sentence has been completed.

Figure 12A:
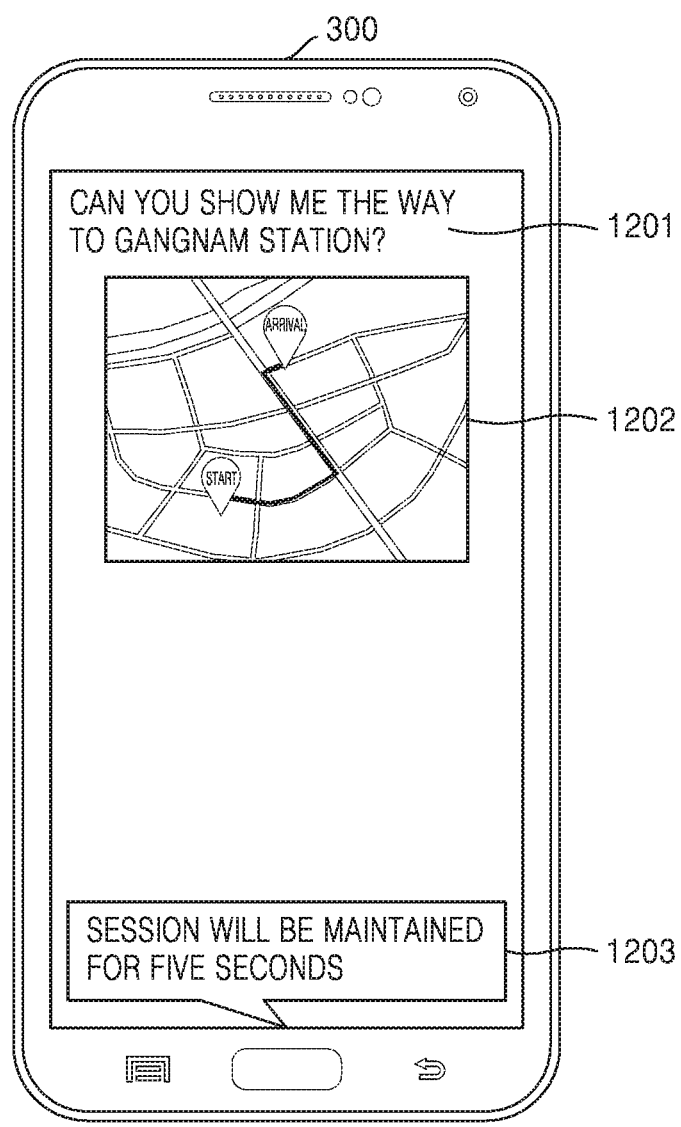
FIGS. 12A and 12B illustrate another example in which a speech recognition apparatus outputs a result of speech recognition according to various embodiments of the present disclosure.

For example, as illustrated in FIG. 12A, a case where a speaker A utters "Can you show me the way", and then utters, after a brief pause, "to Gangnam station?", will be described. The speech recognition apparatus 300 may compare a threshold time with the brief pause with respect to the utterance. In a case where a speech signal including "Can you show me the way" and a speech signal including "to Gangnam station?" are detected one after the other and having a pause shorter than the threshold time, the speech recognition apparatus 300 may determine that the speech signals comprise one sentence. The speech recognition apparatus 300 may determine then, as one sentence, text that is extracted from a combination of the speech signals and includes "Can you show me the way to Gangnam station?", and may output a result of performing the speech recognition on the text.

In an embodiment, the speech recognition apparatus 300 may perform natural language processing on the result of performing the speech recognition. The speech recognition apparatus 300 may perform natural language processing on the text assumed to have been uttered by the speaker. The speech recognition apparatus 300 may also recognize intention of the utterance by the speaker by performing natural language processing. The speech recognition apparatus 300 performs natural language processing on the result of performing the speech recognition, thereby determining whether the speech signals were uttered for the purpose of speech recognition by the speaker.

In an embodiment, the speech recognition apparatus 300 may also perform natural language processing on a result of performing the speech recognition on a previous speech signal detected while the session is maintained. The speech recognition apparatus 300 performs natural language processing on the result of performing the speech recognition on the previous speech signal (hereinafter, referred to as the previous speech recognition result), and a result of performing the speech recognition on a current speech signal (hereinafter, referred to as the current speech recognition result), thereby determining whether the current speech signal has been uttered for the purpose of speech recognition by the speaker. When a correlation between the previous speech recognition result and the current speech recognition result is high, the speech recognition apparatus 300 may determine that the speaker has uttered the current speech signal so as to perform the speech recognition.

In an embodiment, the speech recognition apparatus 300 may analyze, by performing natural language processing, a meaning of a first text extracted from the previous speech signal and a meaning of a second text extracted from the current speech signal. To analyze the meaning of text includes, but is not limited to, recognizing intention associated with a sentence, i.e., whether the speaker asks a question, whether the speaker makes a request, or whether the speaker simply expresses his/her feelings, or may indicate determining a category of the question or the request. Alternatively, to analyze the meaning of text includes extracting at least one keyword from the text.

In an embodiment, the speech recognition apparatus 300 may calculate a correlation between the first text and the second text based on the meanings of the first text and the second text. For example, the speech recognition apparatus 300 compares the calculated correlation with a predetermined threshold value, thereby determining whether the speaker has uttered the current speech signal so as to perform the speech recognition. When a correlation between the previous speech signal and the current speech signal is greater than the predetermined threshold value, the speech recognition apparatus 300 may determine that the speaker has uttered the previous speech signal and then the current speech signal so as to perform the speech recognition.

In an embodiment, when the speech recognition apparatus 300 determines that the speech signal has been uttered for speech recognition by the speaker, the speech recognition apparatus 300 may output a result of performing the speech recognition. When the speech recognition apparatus 300 determines that the speech signal has not been uttered for speech recognition by the speaker, the speech recognition apparatus 300 may not output the result of performing the speech recognition.

An embodiment of determining whether to output a speech recognition result by additionally performing natural language processing on a speech signal will be described in detail with reference to FIGS. 13 and 14.

In an embodiment, when the speaker of the speech signal is the registered speaker, the speech recognition apparatus 300 may update registered speaker information by performing adaptation training using the speaker information generated in operation S420. For example, the speech recognition apparatus 300 gradually performs the adaptation training on input speech from the same speaker, thereby improving performance of recognizing the registered speaker. A method of updating, by the speech recognition apparatus 300, the registered speaker information will be described in detail with reference to FIG. 10.

Figure 5:
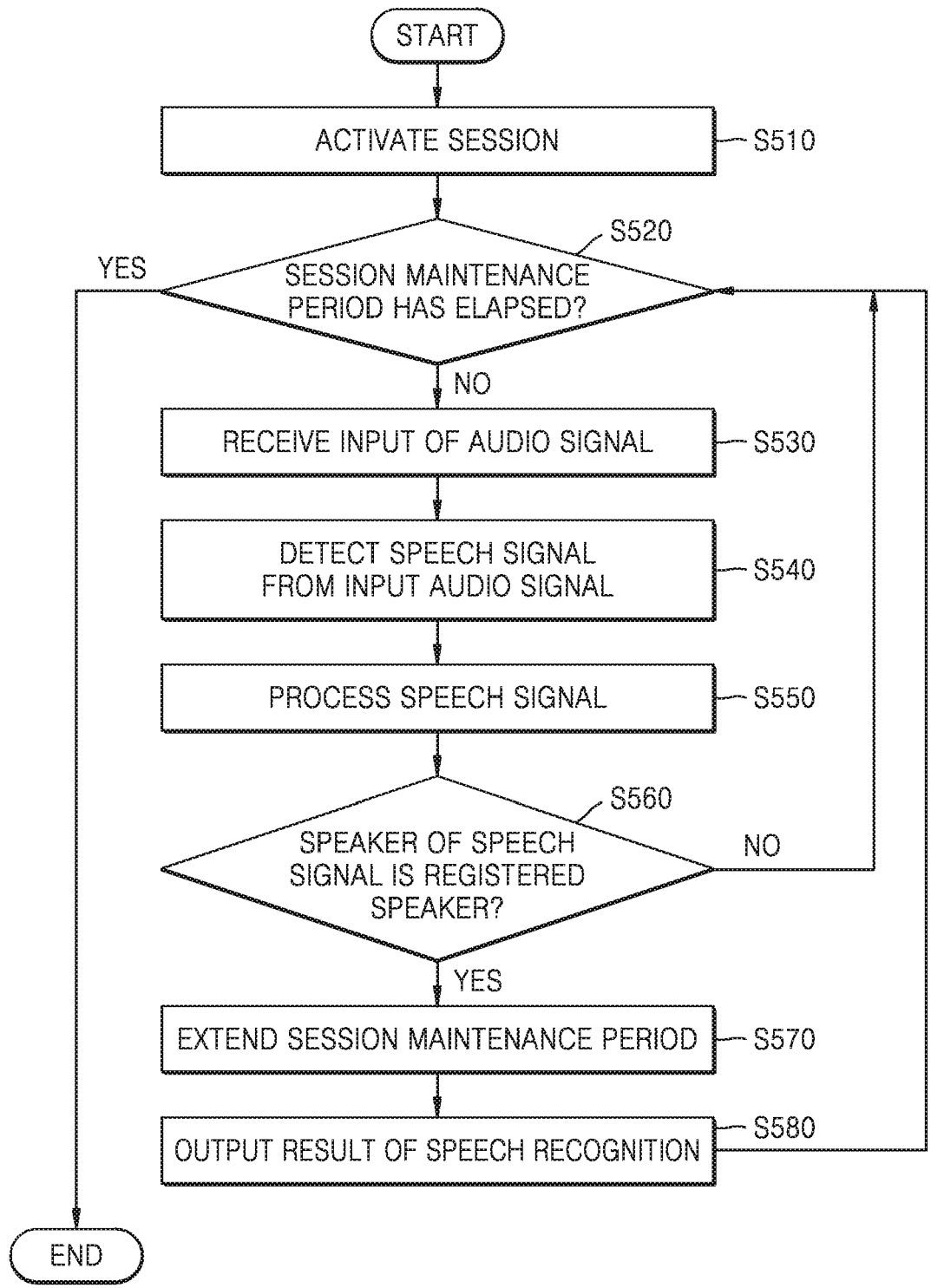
FIG. 5 is a flowchart of a speech recognition method according to another embodiment of the present disclosure.

FIG. 5 is a flowchart of a speech recognition method according to an embodiment of the present disclosure.

Operation S510 of FIG. 5 may correspond to operation S410 of FIG. 4, operations S520 through S550 of FIG. 5 may correspond to operation S420 of FIG. 4, operation S560 of FIG. 5 may correspond to operation S430 of FIG. 4, operation S570 of FIG. 5 may correspond to operation S440 of FIG. 4, and operation S580 of FIG. 5 may correspond to operation S450 of FIG. 4. The descriptions of FIG. 4 may be applied to operations of FIG. 5 which correspond to operations of FIG. 4, respectively. Thus, descriptions about redundant operations are omitted here.

In operation S510, the speech recognition apparatus 300 may activate a session. In an embodiment, when the speech recognition apparatus 300 activates the session, the speech recognition apparatus 300 may set the session to be maintained during a preset session maintenance period and then ended after the session maintenance period. For example, the session maintenance period may be several seconds or several minutes. When the speech recognition apparatus 300 activates the session, the speech recognition apparatus 300 may also start an operation of receiving an input of an audio signal.

In operation S520, the speech recognition apparatus 300 may determine whether the session maintenance period has elapsed. In an embodiment, when the session maintenance period has elapsed, the speech recognition apparatus 300 may end the session and no longer receive an audio signal for speech recognition.

In operation S530, when the session maintenance period has not elapsed (e.g., when the session is maintained), the speech recognition apparatus 300 may continue to receive the input of the audio signal.

In operation S540, the speech recognition apparatus 300 may detect a speech signal from the input audio signal.

In operation S550, the speech recognition apparatus 300 may generate a speech recognition result by performing speech recognition on the speech signal, and may generate information about a speaker of the speech signal. The speech recognition apparatus 300 may generate speaker information about a corresponding frame by using information about each of the frames of the speech signal to which the speech recognition is performed in real-time.

In operation S560, the speech recognition apparatus 300 may determine whether the speaker of the speech signal is a registered speaker based on the speaker information generated in operation S550. When the speech recognition apparatus 300 determines that the speaker of the speech signal is not the registered speaker, the speech recognition apparatus 300 may change settings with respect to the session or may not output the speech recognition result. The speech recognition apparatus 300 may then return to operation S520 and repeatedly perform an operation of receiving an audio signal during the remaining session maintenance period and performing the speech recognition.

In operation S570, when the speech recognition apparatus 300 determines that the speaker of the speech signal is the registered speaker, the speech recognition apparatus 300 may extend the session maintenance period. For example, the speech recognition apparatus 300 may set the session to remain activated during a preset extended period and then ended after the extended period. The preset extended period may be equal to the session maintenance period, but embodiments are not limited thereto.

For example, when the preset session maintenance period is five seconds and the speech recognition apparatus 300 determines that the speaker of the speech signal is the registered speaker, the speech recognition apparatus 300 may extend the session maintenance period so as to allow the session to be extended for five seconds, regardless of a remaining time of the session maintenance period.

In operation S580, the speech recognition apparatus 300 may output a result of the speech recognition performed in operation S550. After the speech recognition apparatus 300 outputs the result of performing the speech recognition, the speech recognition apparatus 300 may then return to operation S520 and repeatedly perform the operation of receiving an audio signal during the remaining session maintenance period and performing the speech recognition.

When a plurality of speakers are registered, the speech recognition apparatus 300 may output speech recognition results respectively for the speakers. For example, when the plurality of speakers talk, the speech recognition apparatus 300 may distinguish between the speakers with respect to speech recognition results for utterances of the speakers, and may output the speech recognition results in a serial or parallel manner.

A case in which a speaker A and a speaker B are both registered speakers, and speaker A utters "Inform me of today's weather" and then speaker B utters "Inform me of tomorrow's weather", will now be described.

The speech recognition apparatus 300 may process a speech signal a uttered by speaker A, and may determine that a speaker of the speech signal a is speaker A who is a registered speaker. Since the speaker of the speech signal a is speaker A who is a registered speaker, the speech recognition apparatus 300 may extend a session maintenance period and may output a speech recognition result. The speech recognition apparatus 300 may output, to a screen or other display, text of "Inform me of today's weather" that is the result of performing speech recognition on the speech signal a, and may then output information about today's weather to the screen in response to the request of "Inform me of today's weather".

The speech recognition apparatus 300 may also process a speech signal b uttered by speaker B, and may determine that a speaker of the speech signal b is speaker B who is also a registered speaker. Since the speaker of the speech signal b is speaker B who is a registered speaker, the speech recognition apparatus 300 may extend the session maintenance period and may output a speech recognition result. The speech recognition apparatus 300 may output, to the screen or other display, text of "Inform me of tomorrow's weather" that is the result of performing speech recognition on the speech signal b, and may then output information about tomorrow's weather to the screen in response to the request of "Inform me of tomorrow's weather".

The speech recognition apparatus 300 may output, in a serial or parallel manner, a speech recognition result R_a (at least one of the text of "Inform me of today's weather" and the information about today's weather) about the utterance by speaker A, and a speech recognition result R_b (at least one of the text of "Inform me of tomorrow's weather" and the information about tomorrow's weather) about the utterance by speaker B.

For example, the speech recognition apparatus 300 may sequentially output the speech recognition result R_a and the speech recognition result R_b to a same area of the screen. In another example, the speech recognition apparatus 300 may output the speech recognition result R_a, and then may sequentially output the speech recognition result R_b beside or below the speech recognition result R_a. The speech recognition apparatus 300 may also display information indicating speakers that respectively correspond to the speech recognition results. For example, the speech recognition apparatus 300 may display an icon representing speaker A adjacent to the speech recognition result R_a, and may display an icon representing speaker B adjacent to the speech recognition result R_b.

As another example, the speech recognition apparatus 300 may divide the screen into a plurality of areas including a first area and a second area, and may output, in a parallel manner, the speech recognition result R_a and the speech recognition result R_b to different areas. The speech recognition apparatus 300 may output the speech recognition result R_a to the first area, and may output the speech recognition result R_b to the second area in a parallel manner. The speech recognition apparatus 300 may also display information indicating speakers that respectively correspond to speech recognition results. For example, the speech recognition apparatus 300 may display that the first area to which speech recognition result R_a is output is an area for outputting the speech recognition result about any utterance by speaker A, and may display that the second area to which speech recognition result R_b is output is an area for outputting the speech recognition result about any utterance by speaker B.

Figure 6:
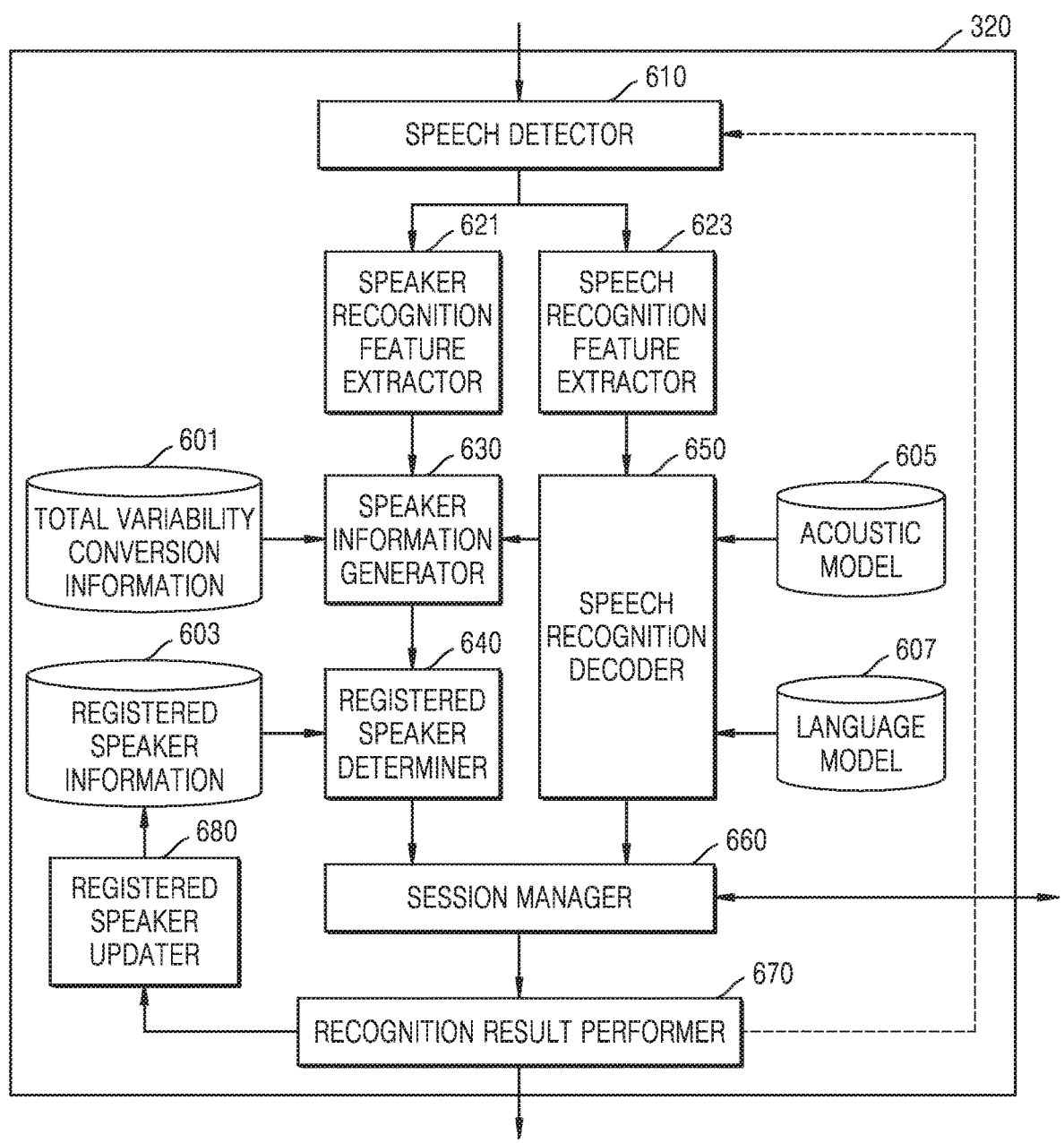
FIG. 6 is a block diagram of a processor according to an embodiment of the present disclosure.

FIG. 6 is a block diagram of a processor according to an embodiment of the present disclosure.

Referring to FIG. 6, a block diagram of the processor 320 is shown. Some or all of the blocks illustrated in FIG. 6 may be realized by hardware and/or software components configured to perform specified functions. The functions performed by the blocks illustrated in FIG. 6 may be realized by one or more microprocessors, or circuit components for the functions. Some or all of the blocks illustrated in FIG. 6 may also be software modules written in various programming languages or script languages to be executed by the processor 320.

In the processor 320 of FIG. 6, a speech detector 610 is provided and may detect a speech signal corresponding to an utterance from an input audio signal when a session is activated, such as when a speaker inputs the utterance that is a target of speech recognition. The speech detector 610 may transmit the detected speech signal to feature extractors 621 and 623.

As illustrated in FIG. 6, the feature extractors 621 and 623 may include a speaker recognition feature extractor 621 and a speech recognition feature extractor 623. In an embodiment, the speaker recognition feature extractor 621 may extract, from the detected speech signal, a speaker recognition feature vector which is for robust speaker recognition, and may transmit the speaker recognition feature vector to a speaker information generator 630. The speech recognition feature extractor 623 may extract, from the detected speech signal, a speech recognition feature vector which is for robust speech recognition, and may transmit the speech recognition feature vector to a speech recognition decoder 650.

The speech recognition decoder 650 may perform speech recognition based on one or more of an acoustic model and a language model by using the speech recognition feature vector received from the speech recognition feature extractor 623, and may generate a result of the speech recognition. The speech recognition decoder 650 may transmit in real-time states posteriors extracted by using the acoustic model to the speaker information generator 630. The speech recognition decoder 650 may also transmit the result of the speech recognition to a session manager 660. The result of the speech recognition is transmitted to the session manager 660, and whether the result of the speech recognition is to be performed may be determined based on a processing result from a registered speaker determiner 640.

The speaker information generator 630 generates speaker information about a speaker of the speech signal by using the speaker recognition feature vector received from the speaker recognition feature extractor 621, the states posteriors received in real-time from the speech recognition decoder 650, a universal background model, and total variability conversion information obtained by training based on big data. The speaker information generator 630 may transmit the generated speaker information to the registered speaker determiner 640.

The speech recognition decoder 650 and the speaker information generator 630 may interoperate with each other so as to share information in real-time. Since the speech recognition decoder 650 and the speaker information generator 630 interoperate with each other, the speech recognition decoder 650 and the speaker information generator 630 may be synchronized and a time lag between a plurality of pieces of information processed by elements may not occur.

The registered speaker determiner 640 may compare the speaker information generated by the speaker information generator 630 with registered speaker information 603 about a pre-registered speaker, and may calculate a similarity between the speaker information and the registered speaker information 603. In an embodiment, the registered speaker information 603 may be previously stored and/or updated thereafter. The registered speaker determiner 640 compares the calculated similarity with a predetermined threshold value, thereby determining whether the speaker of the detected speech signal is equal to the pre-registered speaker. The registered speaker determiner 640 may transmit, to the session manager 660, a speaker verification result including information about whether the speaker of the detected speech signal is equal to the pre-registered speaker. The registered speaker determiner 640 may transmit the speaker information with the speaker verification result to the session manager 660.

The session manager 660 may manage activation of a session, maintenance of the session, and an end of the session.

In an embodiment, the session manager 660 may activate the session based on a user input. The session manager 660 may receive the user input from a user input device. Alternatively, the session manager 660 may receive the user input from the receiver 310 of FIG. 3A or 3B. When a predefined user input for activating a session and a newly-received user input correspond to each other, the session manager 660 may activate the session. In order to activate the session, the session manager 660 may transmit, to the receiver 310 of FIG. 3A or 3B, a control signal for controlling the receiver 310 of FIG. 3A to start an operation of receiving an input of an audio signal. In this regard, the session manager 660 may set the session to be maintained during a preset session maintenance period and then ended after the preset session maintenance period.

In an embodiment, when the session manager 660 determines that the speaker of the speech signal is equal to the registered speaker, based on the speaker verification result received from the registered speaker determiner 640, the session manager 660 may determine to maintain the session. When the session manager 660 determines that the speaker of the speech signal is equal to the registered speaker, based on the speaker verification result received from the registered speaker determiner 640, the session manager 660 may set the session to be maintained during an extended period.

In an embodiment, when the session manager 660 determines that the speaker of the speech signal is not equal to the registered speaker, based on the received speaker verification result, the session manager 660 may end the session. Alternatively, when the session manager 660 determines that the speaker of the speech signal is not equal to the registered speaker, based on the received speaker verification result, the session manager 660 may maintain the session during only a remaining time of the session maintenance period, and then may end the session.

In addition, in an embodiment, when the speaker of the speech signal is equal to the registered speaker, the session manager 660 may transmit, to a recognition result performer 670, the result of the speech recognition received from the speech recognition decoder 650 and the speaker information received from the registered speaker determiner 640.

When the session manager 660 determines that the session is to be maintained (or when the session is determined to be maintained during the extended period), the recognition result performer 670 is executed. Since the result of the speech recognition is about the speech signal uttered by the registered speaker, the recognition result performer 670 may output the result of the speech recognition.

The recognition result performer 670 may transmit the speaker information to a registered speaker updater 680. In an embodiment, the registered speaker updater 680 may upgrade and update the registered speaker information 603 by performing an adaptation training method using the speaker information (e.g., speaker information extracted from an uttered speech of a speaker determined to be the same speaker as the registered speaker) received from the recognition result performer 670.

Since the session is maintained by the session manager 660, after the recognition result performer 670 outputs the result of the speech recognition, an operation of detecting, by the speech detector 610, a speech and performing the speech recognition is repeatedly performed.

Referring to FIG. 6, total variability conversion information 601, the registered speaker information 603, an acoustic model 605, and a language model 607 are stored in the processor 320, but embodiments are not limited thereto. The total variability conversion information 601, the registered speaker information 603, the acoustic model 605, the language model 607, the generated speaker information, the result of the speech recognition, the speaker verification result, or the like, may be stored in the memory 340 of the speech recognition apparatus 300 or elsewhere, such as cloud storage.

Although not illustrated in FIG. 6, the processor 320 may further include a natural language processor (not shown). The natural language processor may recognize meanings of the result of the speech recognition that have been transmitted to the session manager 660. When the speaker of the speech signal is determined to be equal to the registered speaker, the natural language processor may determine whether text included in the speech signal is uttered by the speaker with the intent to allow the speech recognition to be actually performed. The natural language processor may transmit a result of the determination to the session manager 660 and the recognition result performer 670. The result of the determination performed by the natural language processor may be used in performing the result of the speech recognition or managing the session.

Figure 7:
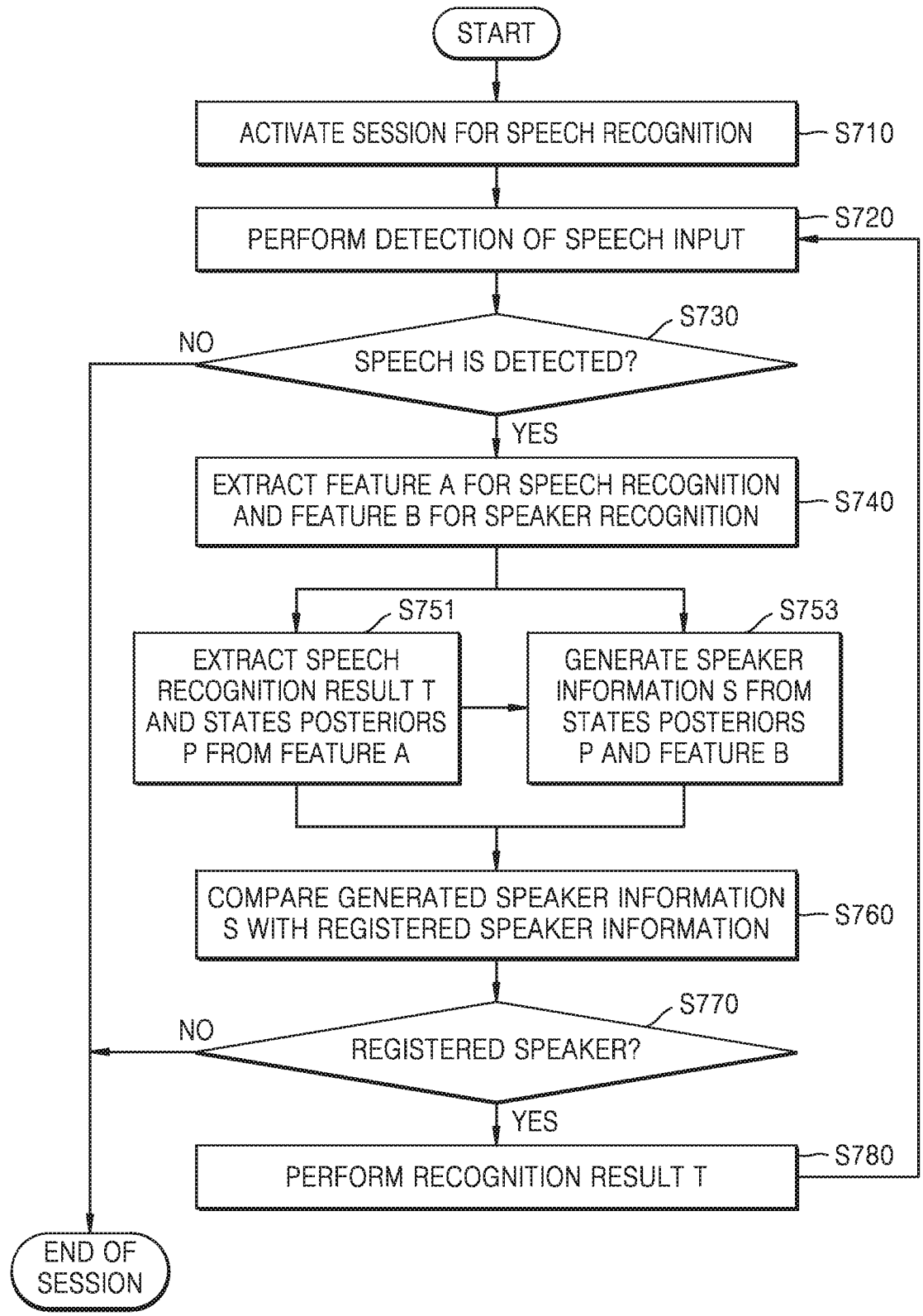
FIG. 7 is a flowchart of a speech recognition method according to another embodiment of the present disclosure.

FIG. 7 is a flowchart of a speech recognition method according to an embodiment of the present disclosure.

Operation S710 of FIG. 7 may correspond to operation S410 of FIG. 4, operations S720 through S760 of FIG. 7 may correspond to operation S420 of FIG. 4, operation S770 of FIG. 7 may correspond to operation S430 of FIG. 4, and operation S780 of FIG. 7 may correspond to operations S440 and S450 of FIG. 4. The descriptions about FIG. 4 may be applied to operations of FIG. 7 which correspond to operations of FIG. 4, respectively. Thus, descriptions about redundant operations are omitted here.

In operation S710, the speech recognition apparatus 300 according to an embodiment may activate a session for speech recognition, and in operation S720, the speech recognition apparatus 300 may detect an input of speech from an input audio signal. In operation S730, when a session maintenance period elapses while the speech is not detected, the speech recognition apparatus 300 may end the session. In operation S730, when the speech recognition apparatus 300 detects the speech, in operation S740, the speech recognition apparatus 300 may extract a feature A for speech recognition and a feature B for speaker recognition from a speech signal. In an embodiment, the feature A for speech recognition and the feature B for speaker recognition may each include a feature vector.

The speech recognition apparatus 300 may perform a speech recognition result on the feature A. In operation S751, the speech recognition apparatus 300 may extract a speech recognition result T and states posteriors P from the feature A. In operation S753, the speech recognition apparatus 300 may generate speaker information S from the states posteriors P generated in operation S751 and the feature B extracted in operation S740. In operation S760, the speech recognition apparatus 300 may compare the speaker information S with registered speaker information. In operation S770, the speech recognition apparatus 300 may determine whether a speaker of the speech signal is equal to a registered speaker. When the speaker of the speech signal is not equal to the registered speaker, the speech recognition apparatus 300 may not extend the session maintenance period and may end the session. In operation S780, the speech recognition apparatus 300 may perform the speech recognition result T obtained by performing the speech recognition.

The expression of performing the speech recognition result T describes that an operation that corresponds to a result of performing the speech recognition may be performed. For example, the speech recognition apparatus 300 may output the speech recognition result T. The speech recognition apparatus 300 may determine a function of the speech recognition apparatus 300 corresponding to the speech recognition result T, and may output an execution screen in which the function is being performed. Alternatively, the speech recognition apparatus 300 may transmit a keyword corresponding to the speech recognition result T to an external server, may receive information about the transmitted keyword from the external server, and then may output the information to a screen.

After the speech recognition apparatus 300 performs the speech recognition result T, the speech recognition apparatus 300 may then return to operation S720 and repeatedly perform the operation of detecting an input of speech.

Figure 8:
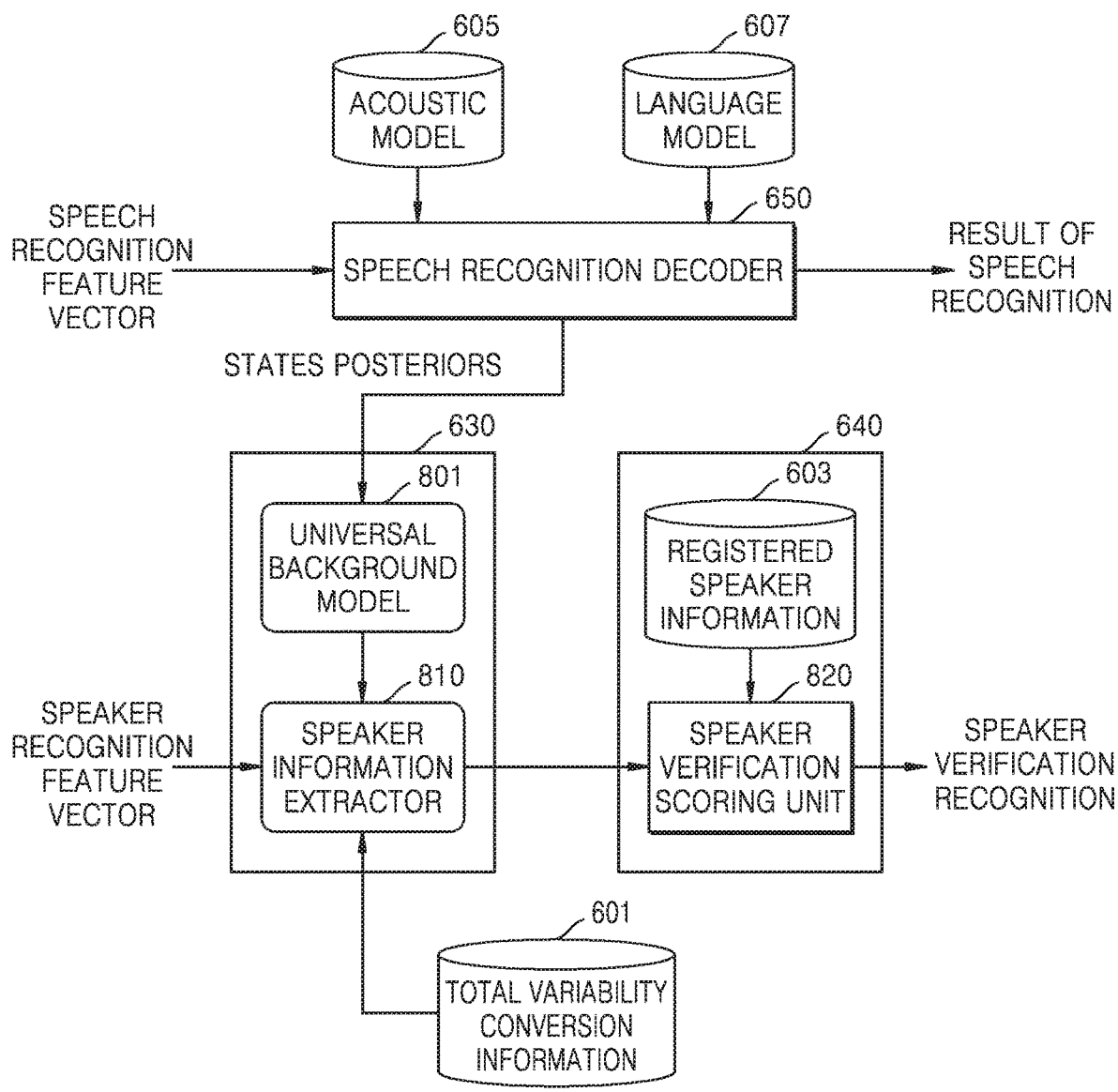
FIG. 8 is a diagram for describing a method of performing speech recognition and generating speaker information performed by a speech recognition apparatus according to an embodiment of the present disclosure.

FIG. 8 is a diagram for describing a method of performing speech recognition and generating speaker information by a speech recognition apparatus according to an embodiment of the present disclosure.

Referring to FIG. 8, the speech recognition decoder 650 may perform speech recognition based on one or more of the acoustic model 605 and the language model 607 by using a speech recognition feature vector extracted from a speech signal, and may generate a result of the speech recognition.

The acoustic model 605 includes information used in determining, in a mono-phone unit or a tri-phone unit, with which sound the speech signal is matched. For example, the speech recognition decoder 650 may calculate probabilities in which the speech signal is matched with several phonemes, respectively, based on the acoustic model 605, and may determine a phoneme that is consequently matched with the speech signal.

The language model 607 includes information used in determining with which word the speech signal is matched. For example, the speech recognition decoder 650 may calculate probabilities in which the speech signal is matched with a plurality of words, respectively, based on the language model 607, and may determine a word that is consequently matched with the speech signal.

The speech recognition decoder 650 may then extract, as the result of speech recognition, text formed of words that match the speech signal based on the acoustic model 605 and the language model 607.

The speech recognition decoder 650 may extract states posteriors from the speech recognition feature vector based on the acoustic model 605, and may transmit the states posteriors to the speaker information generator 630. The states posteriors may include a probability in which a frame of the speech signal is matched with a phoneme, the speech signal being currently processed by the speech recognition decoder 650.

The speaker information generator 630 may generate speaker information by using a speaker recognition feature vector extracted from the speech signal, the states posteriors received in real-time from the speech recognition decoder 650, a universal background model 801 and speaker information extractor 810, and the total variability conversion information 601 obtained by training based on big data.

The universal background model 801 may be generated by learning a speaker-independent model by using a large amount of data including information about speech signals of several speakers, and may indicate an average model with respect to the speech signals of the several speakers. The total variability conversion information 601 may correspond to a total variability conversion matrix.

The total variability conversion information 601 corresponds to a low-rank matrix, and may project variability of a super vector of the gaussian mixture model (GMM) or the deep neural network (DNN) on a low dimensional vector.

For example, when a distribution of acoustic parameters extracted from the speech signal is modeled according to the GMM, information obtained by subtracting the universal background model 801 from a GMM super vector may be expressed as multiplication of an i-vector and the total variability conversion matrix, wherein the GMM super vector is obtained by connecting average values of a plurality of Gaussian indices. The speaker information generator 630 may generate the speaker information from the i-vector. The speaker information generator 630 may remove environment information from the i-vector, thereby generating the speaker information.

The speaker information generated by the speaker information generator 630 may be transmitted to the registered speaker determiner 640. The registered speaker determiner 640 may verify whether a speaker of the speech signal is a registered speaker by comparing the speaker information generated by the speaker information generator 630 with the registered speaker information 603. A speaker verification scoring unit 820 may calculate a probability in which the speaker of the speech signal is the registered speaker based on a similarity between the generated speaker information and the registered speaker information 603. The speaker verification scoring unit 820 may calculate scores in various manners including calculating an inner product between an i-vector included in the generated speaker information and an i-vector included in the registered speaker information

603, and may score whether the speaker of the speech signal is the registered speaker. The registered speaker determiner 640 may output a speaker verification result including information about whether the speaker of the speech signal is equal to the registered speaker based on a calculated value.

Referring again to FIG. 8, the speech recognition apparatus 300 may synchronize a frame to which the speech recognition is performed with a frame to which speaker recognition is performed, and may apply states posteriors about a certain frame to speaker recognition with respect to the certain frame.

The speech recognition apparatus 300 may calculate a similarity between speaker information extracted from a frame and the registered speaker information with respect to each of the frames of the speech signal input in real-time. The speech recognition apparatus 300 may perform speaker verification on each frame based on the calculated similarity. That is, the speech recognition apparatus 300 may determine whether a speaker of each frame is equal to the registered speaker based on the calculated similarity.

The speech recognition apparatus 300 may robustly perform speaker verification on a period longer than one frame by using a similarity calculated for a current frame and similarities calculated for adjacent frames. When similarities calculated for a plurality of frames included in one period are distributed close to a threshold value, the speech recognition apparatus 300 may learn similarities calculated for a period adjacent to the one period, thereby performing speaker verification on the one period with a higher accuracy.

Since the speech recognition apparatus 300 is enabled to robustly perform speaker verification, the speech recognition apparatus 300 may perform speaker verification on a speech signal with a very short frame unit (e.g., 0.1 sec.). Since the speech recognition apparatus 300 may perform the speaker verification on the speech signal with a very short frame unit, the speech recognition apparatus 300 may predict a boundary of utterance of the registered speaker, i.e., a start point and an end point of the utterance. The speech recognition apparatus 300 may determine whether each of a plurality of items of utterance which are input in real-time is output from the registered speaker.

Since the speech recognition apparatus 300 may perform the speaker verification on the speech signal with a very short frame unit, the speech recognition apparatus 300 may determine whether each of a plurality of items of utterance which is input in real-time is output from the registered speaker.

Figure 9:
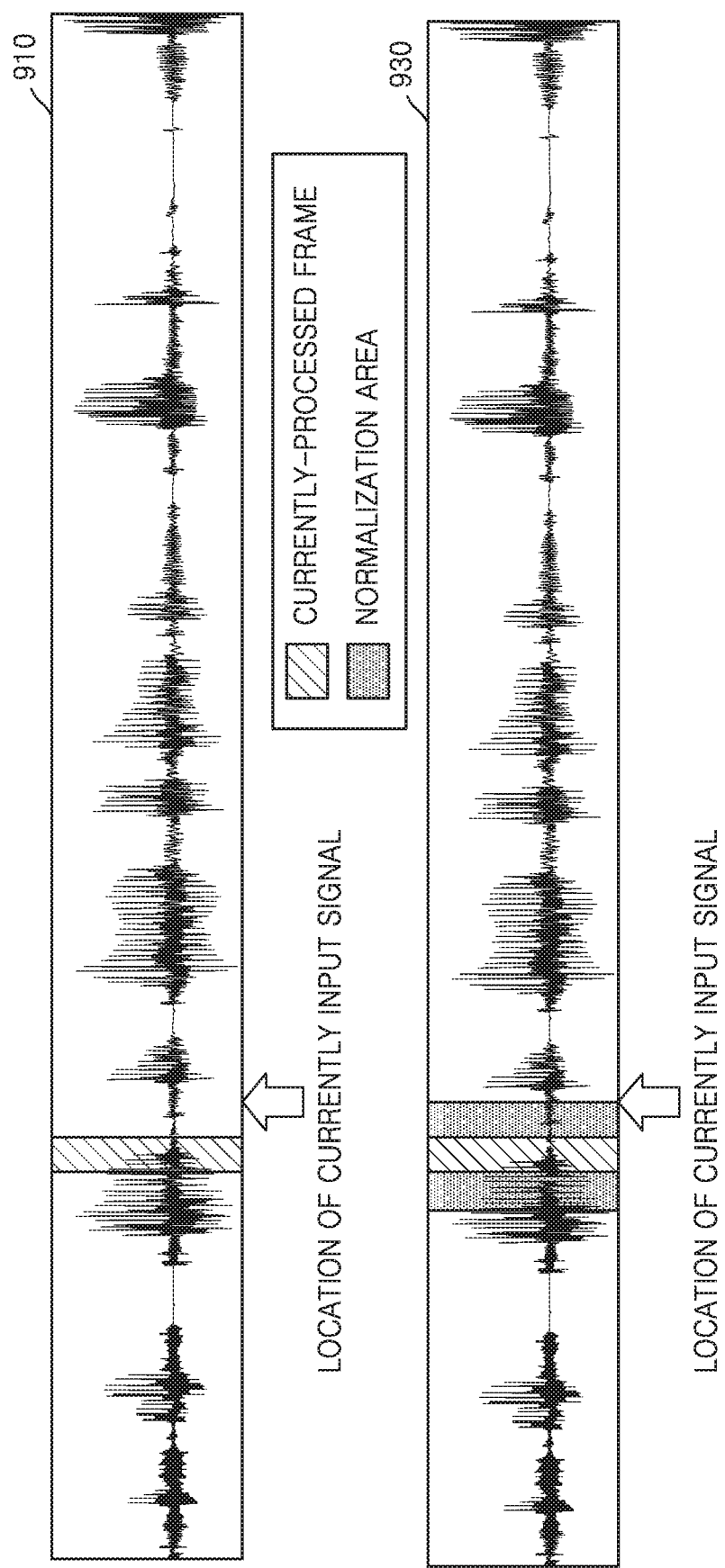
FIG. 9 is a diagram for describing a method of performing normalization by using information of an adjacent frame for speaker recognition in real-time performed by a speech recognition apparatus according to an embodiment of the present disclosure.

FIG. 9 is a diagram for describing a method of performing normalization by using information of an adjacent frame for speaker recognition in real-time by a speech recognition apparatus according to an embodiment of the present disclosure.

The speech recognition apparatus 300 according to an embodiment may perform normalization by using information about an entire utterance from a start point of speech to an end point of the speech. The speech recognition apparatus 300 may perform the normalization and speaker recognition only when a length of a speech signal is equal to or greater than a minimal period, such as three seconds. Such a minimal period is desirable since, when the normalization is performed by using an excessively short speech signal, a speaker recognition performance deteriorates. As illustrated in plot 910, when the normalization is performed by using only a speech signal having one frame length and then speaker recognition is performed, a speaker recognition performance significantly deteriorates. Therefore, the speech recognition apparatus 300 has to obtain a speech signal having a predetermined length for the normalization so that a delay occurs in performing the speaker recognition. Thus, it has been difficult to perform the speaker recognition in real-time.

In order to perform speaker recognition in real-time, the speech recognition apparatus 300 according to an embodiment, may extract speaker information about a frame that is being currently processed, and may perform the normalization by using information of adjacent frames. As illustrated in plot 930, the speech recognition apparatus 300 may extract speaker information about a frame that is being currently processed, and may perform the normalization by using information of adjacent frames. The speech recognition apparatus 300 may then decrease a length of a speech signal for the speaker recognition to 0.3 seconds by performing the normalization by using the adjacent frames.

When information that is adjacent to a current frame and is less than 0.3 seconds is present, the speech recognition apparatus 300 may perform padding on boundary information and may then perform the normalization. For parts of adjacent frames which do not have a speech signal, the speech recognition apparatus 300 may perform padding on a value of a point at which the speech signal ends in the adjacent frames, and may perform the normalization.

Figure 10:
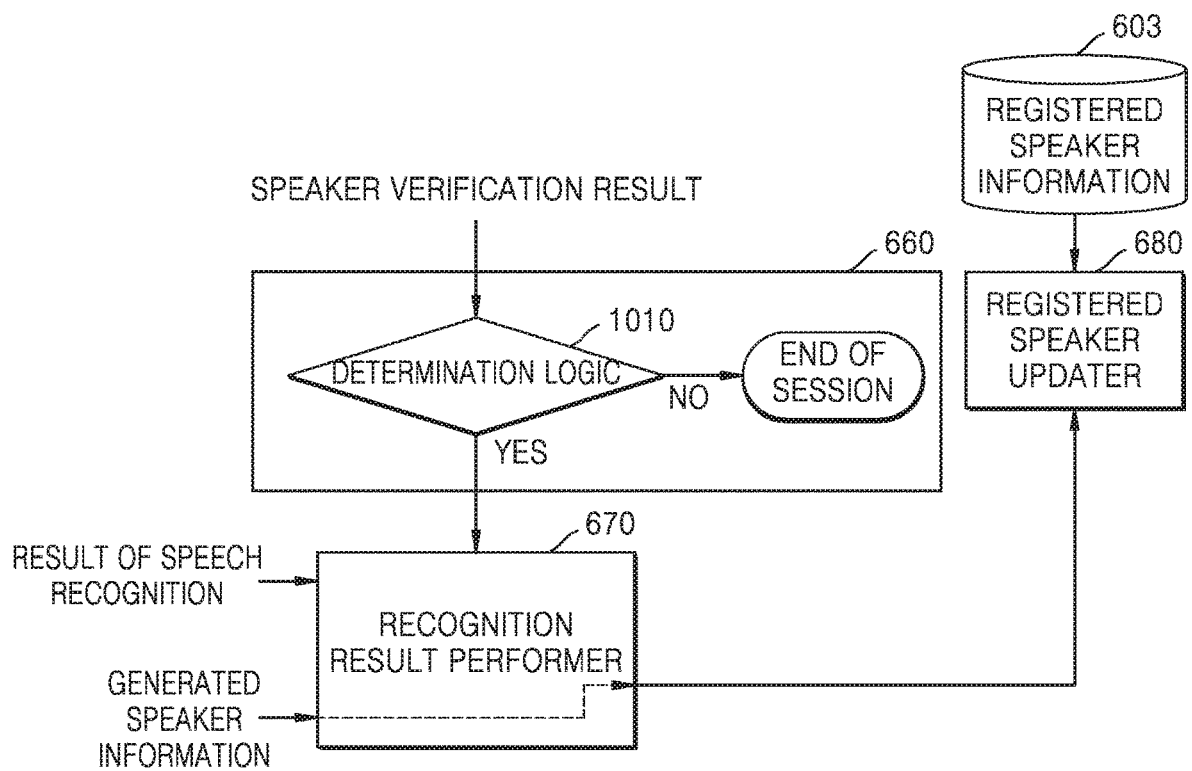
FIG. 10 is a diagram for describing a method of managing maintenance of a session and updating registered speaker information based on a result of speaker recognition performed by a speech recognition apparatus according to an embodiment of the present disclosure.

FIG. 10 is a diagram for describing a method of managing maintenance of a session and updating registered speaker information based on a result of speaker recognition by the speech recognition apparatus according to an embodiment of the present disclosure.

The session manager 660 may manage activation of a session, maintenance of the session, and an end of the session. A determination logic 1010 of the session manager 660 may determine the maintenance of the session and the end of the session based on a speaker verification result including information about whether a speaker of a speech signal is a registered speaker.

When the determination logic 1010 of the session manager 660 determines that the speaker of the speech signal is equal to the registered speaker, the determination logic 1010 may determine that the session is to be maintained. When the determination logic 1010 determines that the speaker of the speech signal is equal to the registered speaker, the determination logic 1010 may set the session to be maintained during a preset extended period, regardless of a remaining time of a session maintenance period.

When the session manager 660 determines that the speaker of the speech signal is not equal to the registered speaker, the session manager 660 may end the session. When the session manager 660 determines that the speaker of the speech signal is not equal to the registered speaker, the session manager 660 may maintain the session during only a remaining time of the session maintenance period, and then may end the session.

When the session manager 660 determines that the session is to be maintained, the recognition result performer 670 may be executed. The recognition result performer 670 may perform an operation corresponding to a result of speech recognition. The recognition result performer 670 may output the result of speech recognition to the output unit 330. The recognition result performer 670 may also transmit speaker information to the registered speaker updater 680.

The registered speaker updater 680 may upgrade the registered speaker information 603 by performing an adaptation training method using the speaker information (e.g., information extracted from an uttered speech of the speaker determined to be the same speaker as the registered speaker) received from the recognition result performer 670, and may update the registered speaker information, which was previously stored, by using the upgraded registered speaker information 603.

For example, when the speech recognition apparatus 300 uses an i-vector as the speaker information, the registered speaker updater 680 may previously store an i-vector R as information about the registered speaker. The i-vector R stored in the registered speaker updater 680 may be obtained from feature values about speech signals uttered by the registered speaker. The registered speaker updater 680 may store information used in obtaining the i-vector$_R$.

Whenever the registered speaker updater 680 receives an i-vector$_{new}$ from the recognition result performer 670, the registered speaker updater 680 may accumulate received information, thereby obtaining again an i-vector R. Since a speech signal is detected in real-time, the registered speaker updater 680 may accumulate information used in detecting the i-vector$_{new}$ for each of frames of the speech signal. The registered speaker updater 680 may obtain again an i-vector$_R$ by using the accumulated information. The registered speaker updater 680 may update the pre-stored i-vector$_R$ by using the re-obtained i-vector$_R$.

The registered speaker updater 680 may store speaker information before adaptation training, and when an adaptation training performance deteriorates, the registered speaker updater 680 may change the speaker information before adaptation training to registered speaker information to which the adaptation training has been performed. The registered speaker updater 680 may store an i-vector$_{R\_before}$ before adaptation training, and may extract an i-vector$_{R\_after}$ after adaptation training. The registered speaker updater 680 may compare a scoring value between the i-vector$_R$ before and the i-vector$_{new}$ with a scoring value between the i-vector$_{R\_after}$ and the i-vector$_{new}$. When a scoring value with respect to the i-vector$_{R\_after}$ after adaptation training is smaller than the i-vector$_{R\_before}$ before adaptation training, the registered speaker updater 680 may determine that the adaptation training performance deteriorated. When the adaptation training performance deteriorates, the registered speaker updater 680 may change the i-vector$_{R\_after}$ to the i-vector$_{R\_before}$, and may store the i-vector$_{R\_before}$ as registered speaker information.

Hereinafter, with reference to FIGS. 11A through 14C, examples in which the speech recognition apparatus 300 according to embodiments outputs a result of speech recognition are illustrated. In the examples illustrated in FIGS. 11A through 14C, it is assumed that the speech recognition apparatus 300 is a smartphone, and recognizes a question or a requested uttered by a speaker, and then outputs a response corresponding to the questions or performs an operation corresponding to the request. However, the present embodiment is not limited to the examples illustrated in FIGS. 11A through 14C.

In addition, the speech recognition apparatus 300 illustrated in FIGS. 11A through 14C may independently recognize speech and output a result of speech recognition. Alternatively, the speech recognition apparatus 300 illustrated in FIGS. 11A through 14C may be connected to an external device, may transmit input speech to the external device, may receive a result of speech recognition from the external device, and may output the result of speech recognition. Alternatively, the speech recognition apparatus 300 illustrated in FIGS. 11A through 14C may be connected to a server, may transmit input speech to the server, may receive a result of speech recognition from the server, and may output the result of speech recognition.

In the examples illustrated in FIGS. 11A through 14C, a speaker A is a registered speaker, but embodiments are not limited to the examples shown and thus, a plurality of speakers may be previously registered, and a plurality of pieces of information about the plurality of registered speakers may be stored.

Figure 11A:
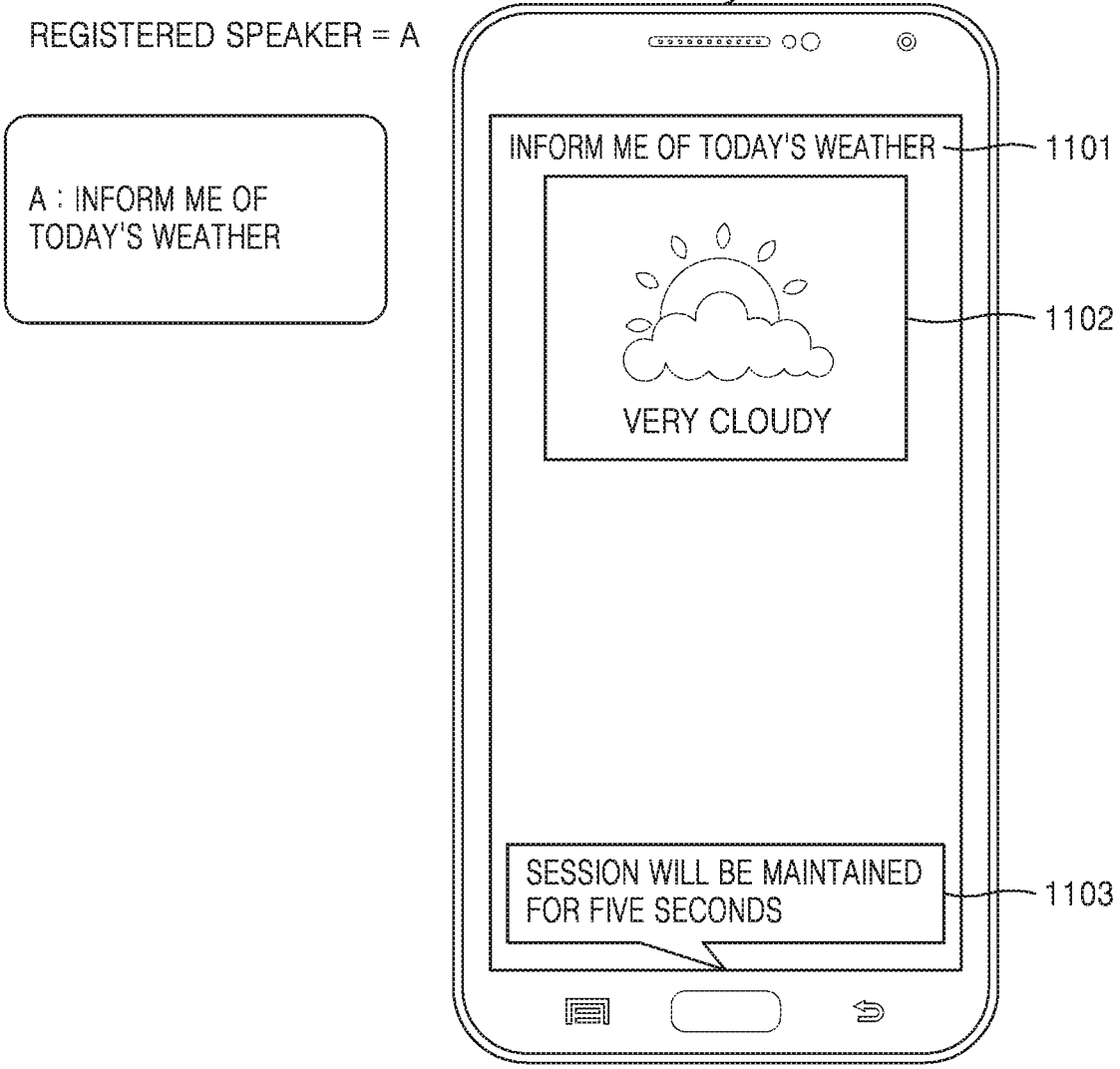
FIGS. 11A, 11B, and 11C illustrate an example in which a speech recognition apparatus outputs a result of speech recognition according to various embodiments of the present disclosure.
Figure 11B:
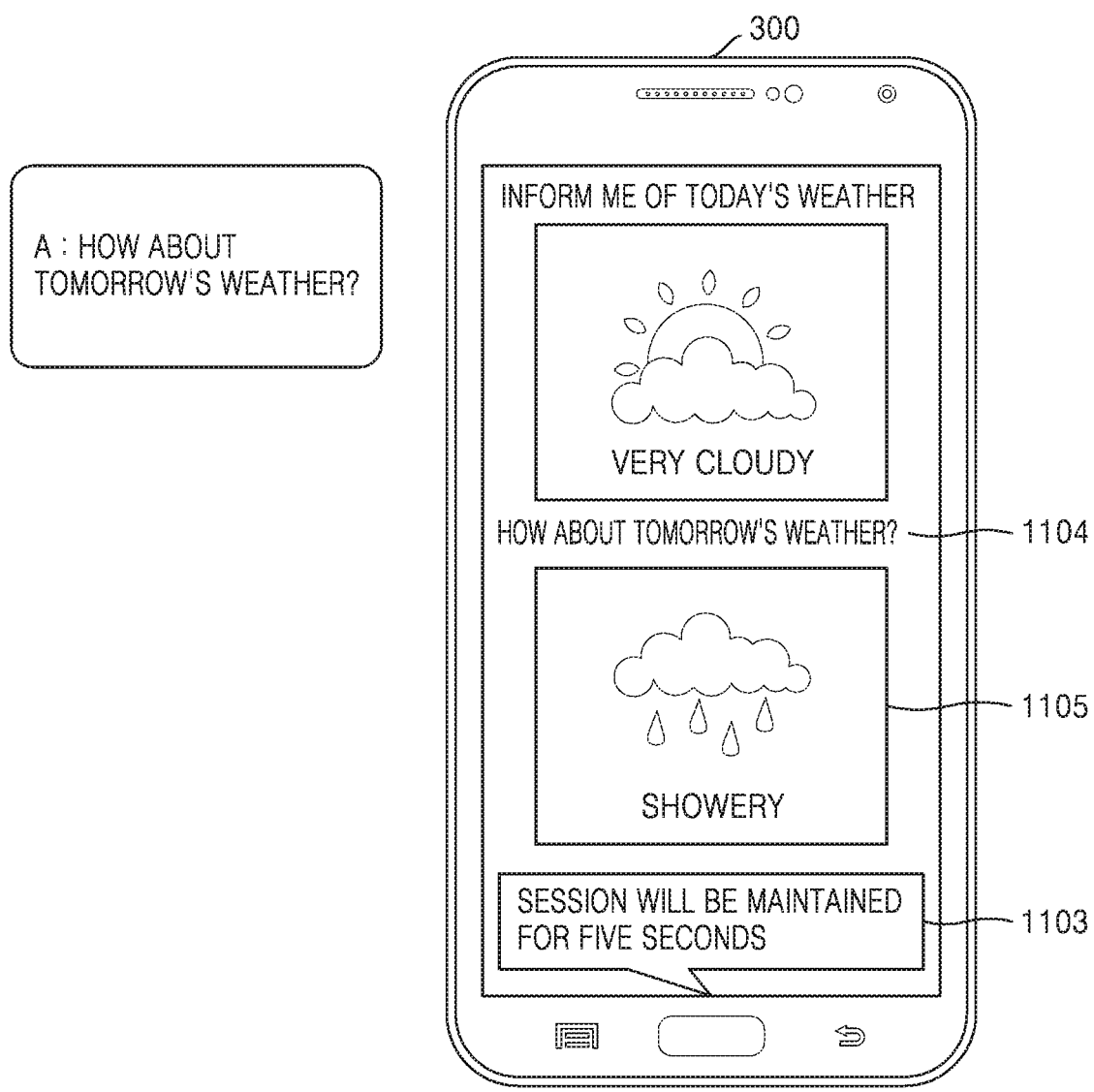
Figure 11C:
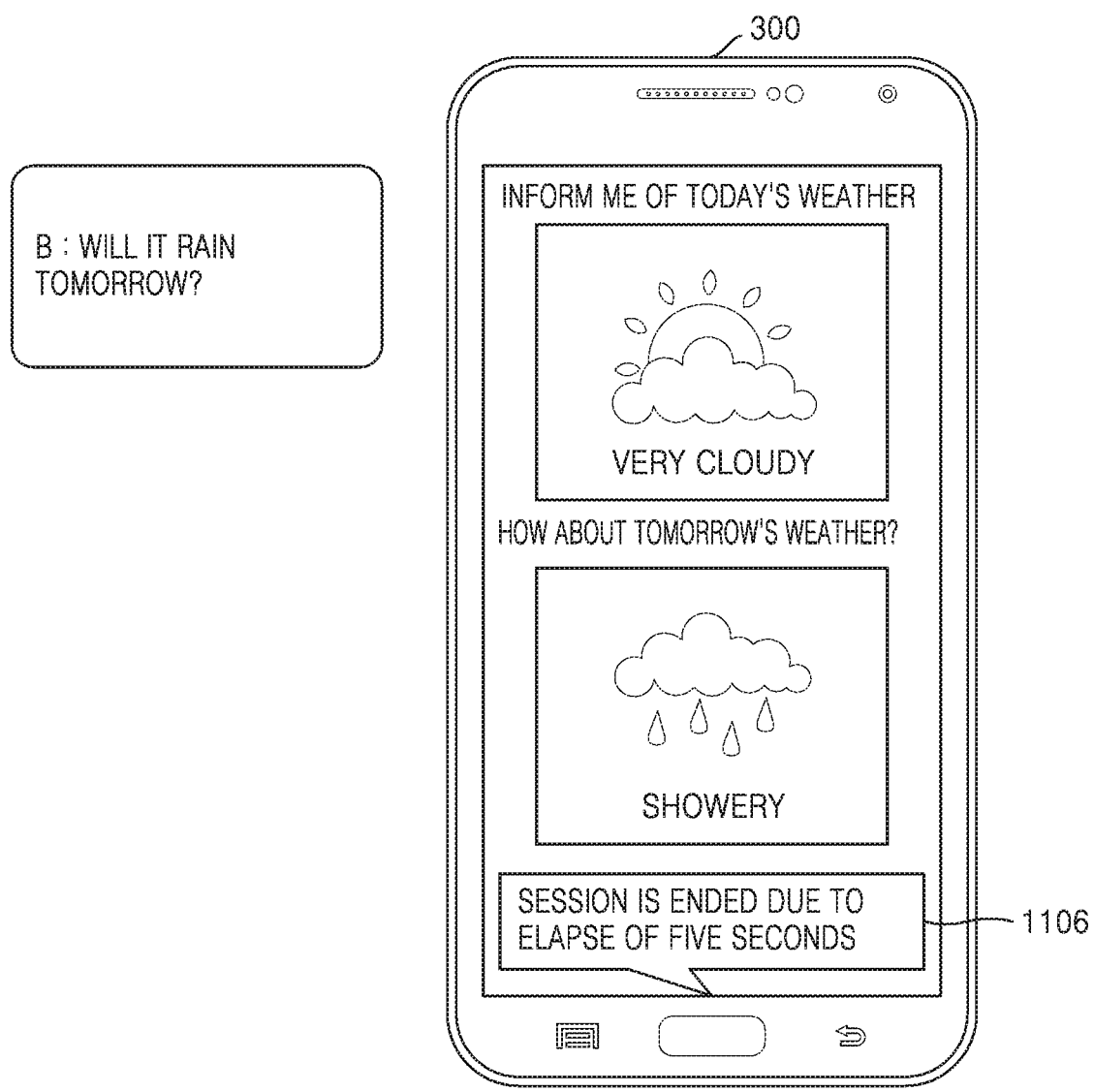

FIGS. 11A, 11B, and 11C illustrate an example in which a speech recognition apparatus outputs a result of speech recognition according to various embodiments of the present disclosure.

A user of the speech recognition apparatus 300 may perform a preset physical operation, thereby allowing a session of the speech recognition apparatus 300 to be activated. For example, the user may press a preset button of the speech recognition apparatus 300, may touch a touchscreen of the speech recognition apparatus 300, may move the speech recognition apparatus 300 in some manner, or may utter a pre-stored call keyword, thereby allowing the session to be activated. However, embodiments are not limited thereto. The speech recognition apparatus 300 may activate the session based on these and other various user inputs.

Referring to FIG. 11A, when a speaker A utters "Inform me of today's weather" for example, the speech recognition apparatus 300 may perform speech recognition on a detected first speech signal. The speech recognition apparatus 300 may determine that speaker A of the first speech signal is equal to a registered speaker A based on speaker information generated from the first speech signal. The speech recognition apparatus 300 may then reset the session to be maintained during a preset extended period (e.g., 5 sec.) based on a result of the determination.

The speech recognition apparatus 300 may output a result of the speech recognition based on the result of the determination. The speech recognition apparatus 300 may output, to a screen or display, text 1101 of "Inform me of today's weather" which is the result of performing the speech recognition based on the detected first speech signal, and may output information 1102 about today's weather to the screen in response to the request of "Inform me of today's weather".

The speech recognition apparatus 300 may also output, to the screen, information 1103 indicating a set time for maintenance of the session. Referring to FIG. 11A, the output information 1103 indicates that the session will be maintained for five seconds, but according to flow of time, the output information 1103 may indicate that the session will be maintained for a time shorter than five seconds.

Referring to FIG. 11B, when speaker A utters "How about tomorrow's weather?" during maintenance of the session, the speech recognition apparatus 300 may perform speech recognition on a detected second speech signal. The speech recognition apparatus 300 may determine that a speaker A of the second speech signal is equal to the registered speaker A based on speaker information generated from the second speech signal. The speech recognition apparatus 300 may then reset the session to be maintained during a preset extended period based on the result of the determination. The speech recognition apparatus 300 may output, to the screen, the information 1103 indicating a reset time for maintenance of the session.

In addition, the speech recognition apparatus 300 may output, to the screen, text 1104 of "How about tomorrow's weather?" which is a result of performing the speech recognition from the second speech signal, and may output information 1105 about tomorrow's weather to the screen in response to the question of "How about tomorrow's weather?".

Referring to FIG. 11C, when a speaker B who is talking to speaker A utters "Will it rain tomorrow?" during maintenance of the session, the speech recognition apparatus 300 may perform speech recognition on a detected third speech signal. In this regard, speaker B did not utter "Will it rain tomorrow?" for the purpose of speech recognition, but uttered it for conversation with speaker A.

The speech recognition apparatus 300 may determine that speaker B of the third speech signal is not equal to the registered speaker A based on speaker information generated from the third speech signal. The speech recognition apparatus 300 may maintain the session during only a remaining time of the session maintenance period based on a result of the determination, and after an elapse of the remaining time of the session maintenance period, the speech recognition apparatus 300 may maintain the setting by which the session is ended. After the elapse of the session maintenance period, the speech recognition apparatus 300 may output, to the screen, information 1106 indicating an end of the session. In addition, the speech recognition apparatus 300 may not output a result of performing the speech recognition on the third speech signal based on the result of the determination.

Thus, as illustrated in FIGS. 11A through 11C, when a registered speaker continuously gives utterances, the speech recognition apparatus 300 according to an embodiment automatically maintains a session so that a user does not need to perform an operation of activating a session for each of the utterances. In addition, since the speech recognition apparatus 300 does not output a result of speech recognition on content of utterance output from a non-registered speaker, the speech recognition apparatus 300 may perform personalized speech recognition and may increase an accuracy of the speech recognition.

Figure 12B:
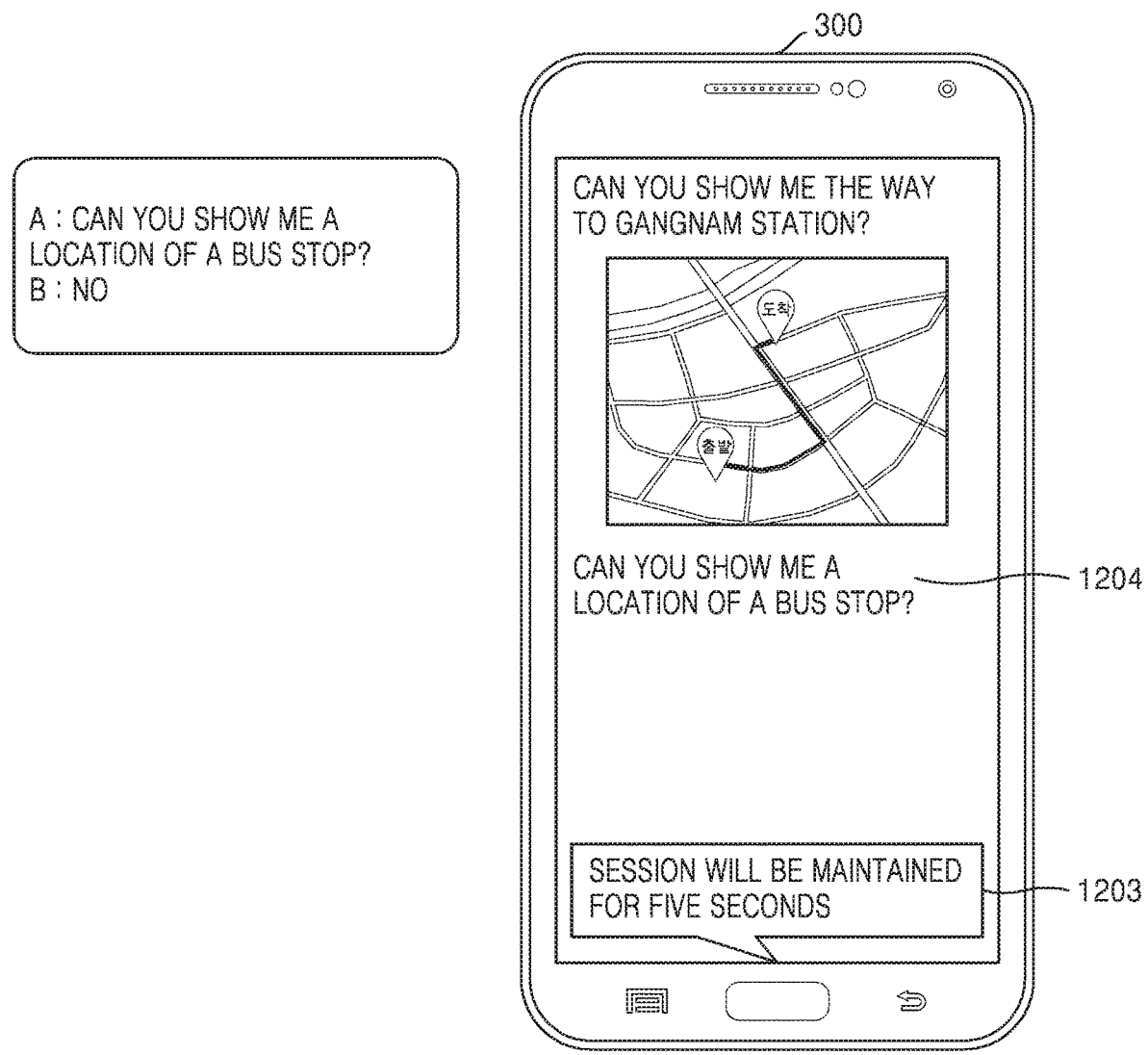

FIGS. 12A and 12B illustrate another example in which a speech recognition apparatus outputs a result of speech recognition according to various embodiments of the present disclosure.

Referring to FIG. 12A, when a speaker A activates a session of the speech recognition apparatus 300 and first utters "to Gangnam station" for example, the speech recognition apparatus 300 may perform speech recognition on a detected first speech signal. The speech recognition apparatus 300 may determine that speaker A of the first speech signal is equal to a registered speaker A based on speaker information generated from the first speech signal. The speech recognition apparatus 300 may then reset the session to be maintained during a preset extended period based on a result of the determination.

When a speaker B who is talking to speaker A utters "Yangjae station" during maintenance of the session, the speech recognition apparatus 300 may perform speech recognition on a detected second speech signal. In this regard, speaker B did not utter "Yangjae station" for the purpose of speech recognition, but uttered it for conversation with speaker A.

The speech recognition apparatus 300 may determine that speaker B of the third speech signal is not equal to the registered speaker A based on speaker information generated from the second speech signal. The speech recognition apparatus 300 may then maintain the session during only a remaining time of the session maintenance period based on a result of the determination, and after an elapse of the remaining time of the session maintenance period, the speech recognition apparatus 300 may maintain the setting by which the session is ended. The speech recognition apparatus 300 may also not output a result of performing the speech recognition on the second speech signal based on the result of the determination.

When speaker A utters "Can you show me the way?" during maintenance of the session, the speech recognition apparatus 300 may perform speech recognition on a detected third speech signal. The speech recognition apparatus 300 may determine that speaker A of the third speech signal is equal to the registered speaker A based on speaker information generated from the third speech signal. The speech recognition apparatus 300 may then reset the session to be maintained during a preset extended period based on a result of the determination.

Since the first speech signal and the third speech signal are sequentially detected with an interval shorter than a threshold time, the speech recognition apparatus 300 may determine that the first speech signal and the third speech signal form one sentence.

Based on the result of the determination that speaker A of the first speech signal and the third speech signal is equal to the registered speaker A, the speech recognition apparatus 300 may output, to the screen, text 1201 of "Can you show me the way to Gangnam station?" which is a result of performing speech recognition on the first speech signal and the third speech signal. In response to a request of showing the way to Gangnam station, the speech recognition apparatus 300 may output, to the screen, information 1202 about the way from a current location to Gangnam station.

The speech recognition apparatus 300 may also output, to the screen, information 1203 indicating a reset time for maintenance of the session.

Referring to FIG. 12B, when speaker A utters "Can you show me a location of a bus stop?" during maintenance of the session, the speech recognition apparatus 300 may perform speech recognition on a detected fourth speech signal. The speech recognition apparatus 300 may determine that speaker A of the fourth speech signal is equal to the registered speaker A, based on speaker information generated from the fourth speech signal. The speech recognition apparatus 300 may then reset the session to be maintained during a preset extended period based on a result of the determination.

Based on the result of the determination that speaker A of the fourth speech signal is equal to the registered speaker A, the speech recognition apparatus 300 may output, to the screen, text 1204 of "Can you show me a location of a bus stop?" which is a result of performing speech recognition on the fourth speech signal. The speech recognition apparatus 300 may also output, to the screen, information corresponding to a request of showing the location of the bus stop.

When a speaker B who is talking to speaker A utters "No" during maintenance of the session, the speech recognition apparatus 300 may perform speech recognition on a detected fifth speech signal. The speech recognition apparatus 300 may not perform an operation of outputting a result of the speech recognition with respect to the fifth speech signal uttered by speaker B who is not the registered speaker A, and may not extend a maintenance period of the session.

The speech recognition apparatus 300 may analyze, by performing natural language processing, a meaning of the first text indicating "Can you show me the way to Gangnam station?" extracted from the first speech signal and the third speech signal. The speech recognition apparatus 300 may also analyze, by performing natural language processing, a meaning of the second text indicating "Can you show me a location of a bus stop?" extracted from the fourth speech signal. When the speech recognition apparatus 300 determines that the request of the second text is unclear or determines that the second text is not a complete sentence, the speech recognition apparatus 300 may compensate for the second text based on content of the first text extracted from previous signals. For example, when a request of text requires output of an excessive amount of information, the speech recognition apparatus 300 may determine that the request of the text is unclear.

Referring to FIGS. 12A and 12B, the speech recognition apparatus 300 may extract a keyword "Gangnam station" from the first text, and may compensate for the second text by using the extracted keyword. The speech recognition apparatus 300 may compensate for the second text and may generate a third text indicating "Can you show me a location of a bus stop near Gangnam station?". In response to the third text, the speech recognition apparatus 300 may output, to the screen, information about the location of the bus stop near Gangnam station.

In the example illustrated in FIGS. 12A and 12B, speaker A is a registered speaker, but the speech recognition apparatus 300 is not limited thereto and thus, a plurality of speakers may be previously registered in the speech recognition apparatus 300, and the speech recognition apparatus 300 may store a plurality of pieces of information about the plurality of speakers.

For example, when speaker A and speaker B are both registered speakers, the speech recognition apparatus 300 may output, in a serial or parallel manner, a result of speech recognition of utterance by speaker A and a result of speech recognition of utterance by speaker B.

The speech recognition apparatus 300 may output text indicating "Can you show me the way to Gangnam station?" to a first area of the screen. In response to a request of showing the way to Gangnam station, the speech recognition apparatus 300 may output, to the first area, information about the way from a current location to Gangnam station. In addition, the speech recognition apparatus 300 may output, to the first area of the screen, the information about the location of the bus stop near Gangnam station.

The speech recognition apparatus 300 may output the result of speech recognition of the utterance by speaker B to a second area that is equal to or different from the first area. The speech recognition apparatus 300 may output text of "Yangjae station" and text of "No" to the second area of the screen. In response to the utterance by speaker B, the speech recognition apparatus 300 may output, to the screen, an image, location information, or the like, related to "Yangjae station".

The speech recognition apparatus 300 may display a result of speech recognition along with information indicating a speaker corresponding to the result. For example, the speech recognition apparatus 300 may display an icon indicating speaker A on the periphery of the result of speech recognition of the utterance by speaker A, and may display an icon indicating speaker B on the periphery of the result of speech recognition of the utterance by speaker B. Alternatively, the speech recognition apparatus 300 may display that the first area corresponds to speaker A, and display that the second area corresponds to speaker B.

Figure 13A:
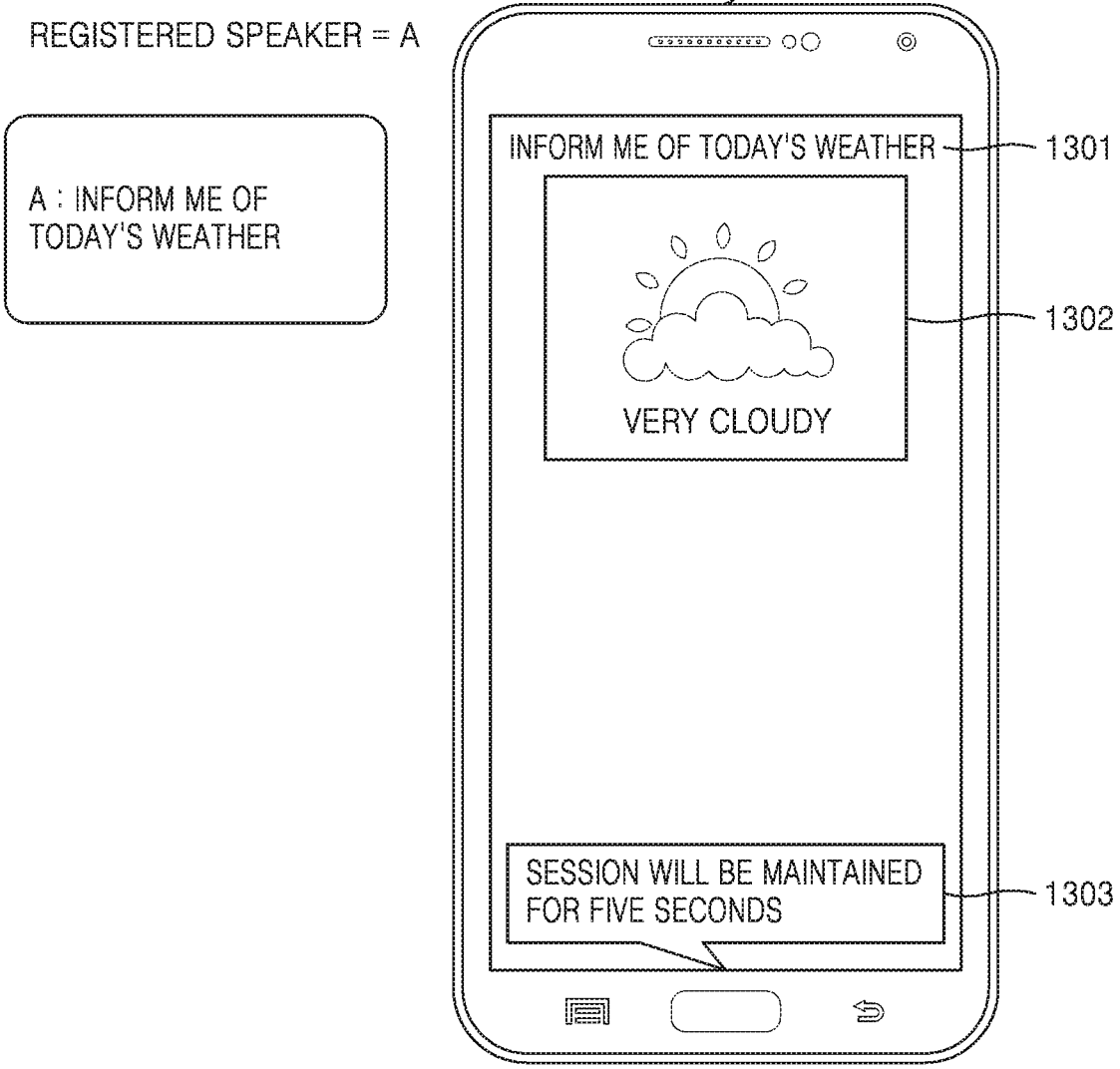
FIGS. 13A, 13B, and 13C illustrate another example in which a speech recognition apparatus outputs a result of speech recognition according to various embodiments of the present disclosure.
Figure 13B:
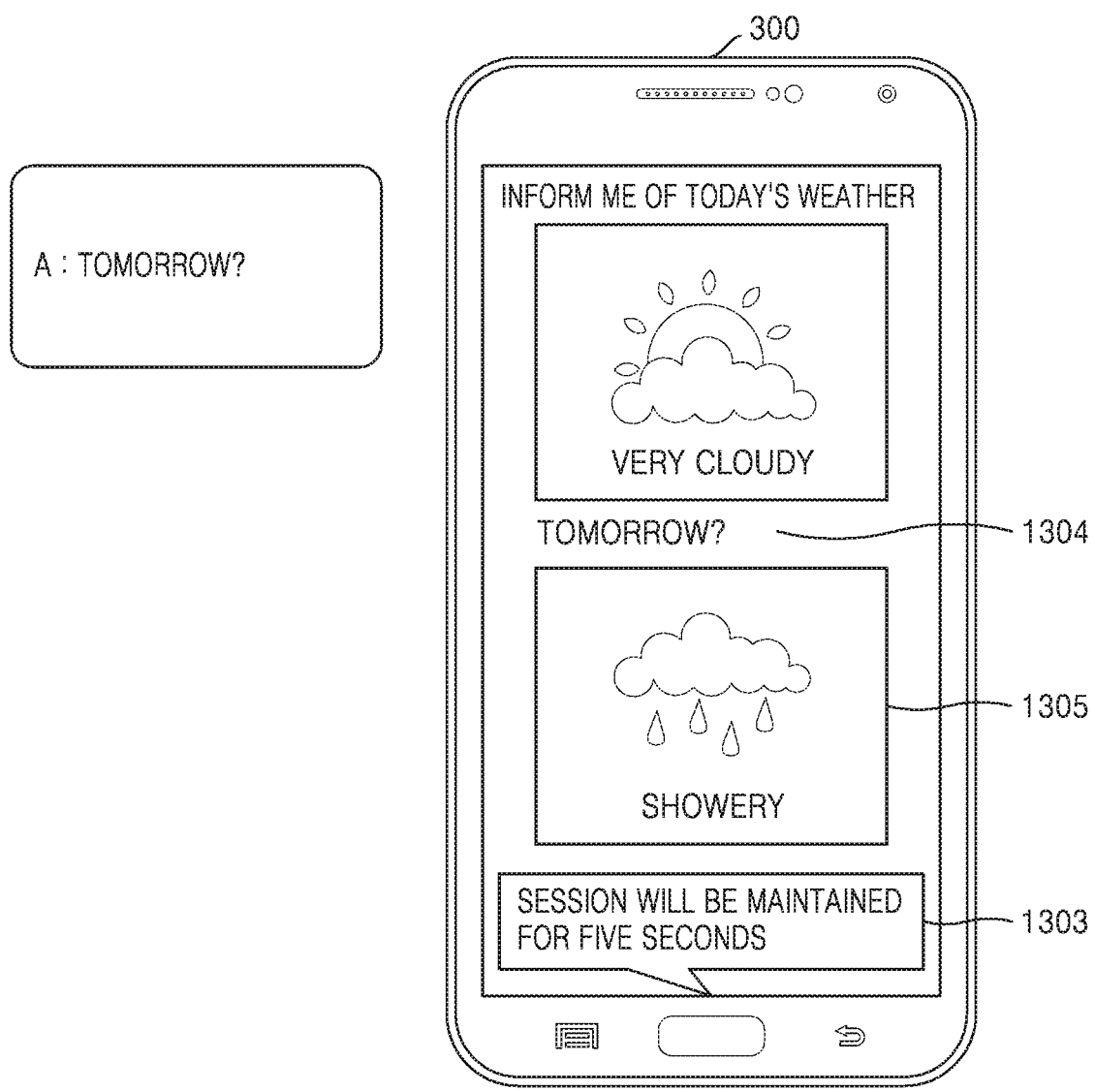
Figure 13C:
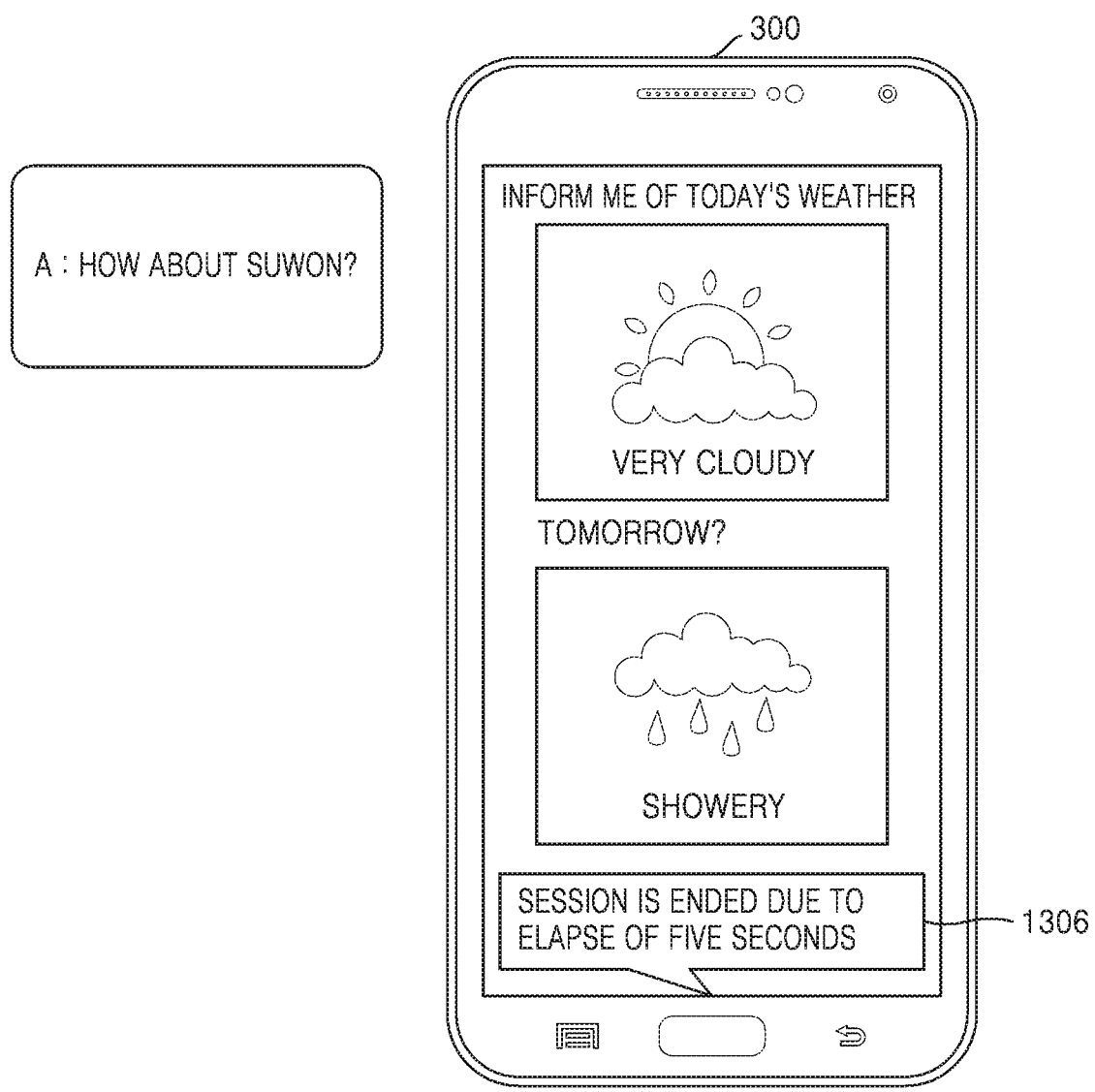

FIGS. 13A, 13B, and 13C illustrate another example in which a speech recognition apparatus outputs a result of speech recognition according to various embodiments of the present disclosure.

Referring to FIG. 13A, when a session is activated and a speaker A utters "Inform me of today's weather" for example, the speech recognition apparatus 300 may perform speech recognition on a detected first speech signal. The speech recognition apparatus 300 may determine that speaker A of the first speech signal is equal to a registered speaker A based on speaker information generated from the first speech signal. The speech recognition apparatus 300 may then reset the session to be maintained during a preset extended period based on a result of the determination.

The speech recognition apparatus 300 may output a result of the speech recognition based on the result of the determination. The speech recognition apparatus 300 may output, to the screen, a first text 1301 indicating "Inform me of today's weather" which is the result of performing the speech recognition from the detected first speech signal, and may output, to the screen, information 1302 about today's weather, in response to the request of "Inform me of today's weather".

The speech recognition apparatus 300 may also output, to the screen, information 1303 indicating a set time for maintenance of the session.

Referring to FIG. 13B, when speaker A utters "Tomorrow?" during maintenance of the session, the speech recognition apparatus 300 may perform speech recognition on a detected second speech signal. The speech recognition apparatus 300 may determine that speaker A of the second speech signal is equal to the registered speaker A based on speaker information generated from the second speech signal. The speech recognition apparatus 300 may then reset the session to be maintained during a preset extended period based on a result of the determination.

The speech recognition apparatus 300 may output, to the screen, text 1304 indicating "Tomorrow?" which is a result of performing the speech recognition on the second speech signal based on the result of the determination that the speaker A of the second speech signal is equal to the registered speaker A.

The speech recognition apparatus 300 may output, to the screen, information corresponding to a request of text output to the screen. However, when too many pieces of information corresponding to the request of the text are found, the speech recognition apparatus 300 may determine that the request of the text is unclear, and may compensate for the text, which is being currently processed, based on previous speech signals.

Referring to FIG. 13B, when too many pieces of information which correspond to the request of the second text 1304 and can be provided in regard to tomorrow are found, the speech recognition apparatus 300 may compensate for the second text 1304. The speech recognition apparatus 300 may extract keywords "Inform me of weather" from the first text 1301, and may compensate for the second text 1304 by using the extracted keyword. The speech recognition apparatus 300 may compensate for the second text 1304 and may generate a third text of "Can you inform me of tomorrow's weather?". In response to the third text, the speech recognition apparatus 300 may output information 1305 about tomorrow's weather to the screen, in response to the third text. The speech recognition apparatus 300 may also output, to the screen, information 1303 indicating a set time for maintenance of the session.

Referring to FIG. 13C, when speaker A utters "How about Suwon?" during maintenance of the session, the speech recognition apparatus 300 may perform speech recognition on a detected third speech signal. The speech recognition apparatus 300 may extract a fourth text of "How about Suwon?" from the third speech signal.

The speech recognition apparatus 300 may determine that speaker A of the third speech signal is equal to the registered speaker A based on speaker information generated from the third speech signal.

The speech recognition apparatus 300 may determine whether the third speech signal was uttered by speaker A for speech recognition based on a result of performing speech recognition on a previous speech signal.

The speech recognition apparatus 300 may analyze, by performing natural language processing, a meaning of the fourth text extracted from the third speech signal that is a speech signal being currently processed. The speech recognition apparatus 300 may calculate a correlation between previous texts (i.e., the first through third texts) and the fourth text based on the meanings of the first through third texts and the fourth text. Based on the correlation between the previous texts and the fourth text, the speech recognition apparatus 300 may determine whether speaker A uttered the third speech signal so as to perform speech recognition.

Referring to FIG. 13C, the speech recognition apparatus 300 may determine that the correlation between the previous texts and the fourth text is smaller than a threshold value, and may determine that speaker A did not utter the third speech signal for speech recognition. The speech recognition apparatus 300 may determine that speaker A did not utter the third speech signal for speech recognition, and may not output the fourth text extracted from the third speech signal. The speech recognition apparatus 300 may then maintain the session during only a remaining time of the session maintenance period based on a result of determining whether the third speech signal was uttered by speaker A for speech recognition, and after an elapse of the remaining time of the session maintenance period, the speech recognition apparatus 300 may maintain the setting by which the session is ended. After the elapse of the session maintenance period, the speech recognition apparatus 300 may output, to the screen, information 1306 indicating an end of the session.

However, embodiments are not limited to the example illustrated in FIG. 13C and thus, the speech recognition apparatus 300 may determine that the third speech signal was uttered by speaker A for speech recognition. The speech recognition apparatus 300 may then output, to the screen, information corresponding to the request of the fourth text extracted from the third speech signal. When too many pieces of information which correspond to the request of the fourth text and can be provided in relation to Suwon are found, the speech recognition apparatus 300 may compensate for the fourth text. The speech recognition apparatus 300 may extract keywords of "Inform me of weather" from a first text, and may compensate for the fourth text by using the extracted keywords. The speech recognition apparatus 300 may compensate for the fourth text and may generate a fifth text of "Can you inform me of weather in Suwon?". The speech recognition apparatus 300 may output information about tomorrow's weather to the screen in response to the fifth text.

Figure 14A:
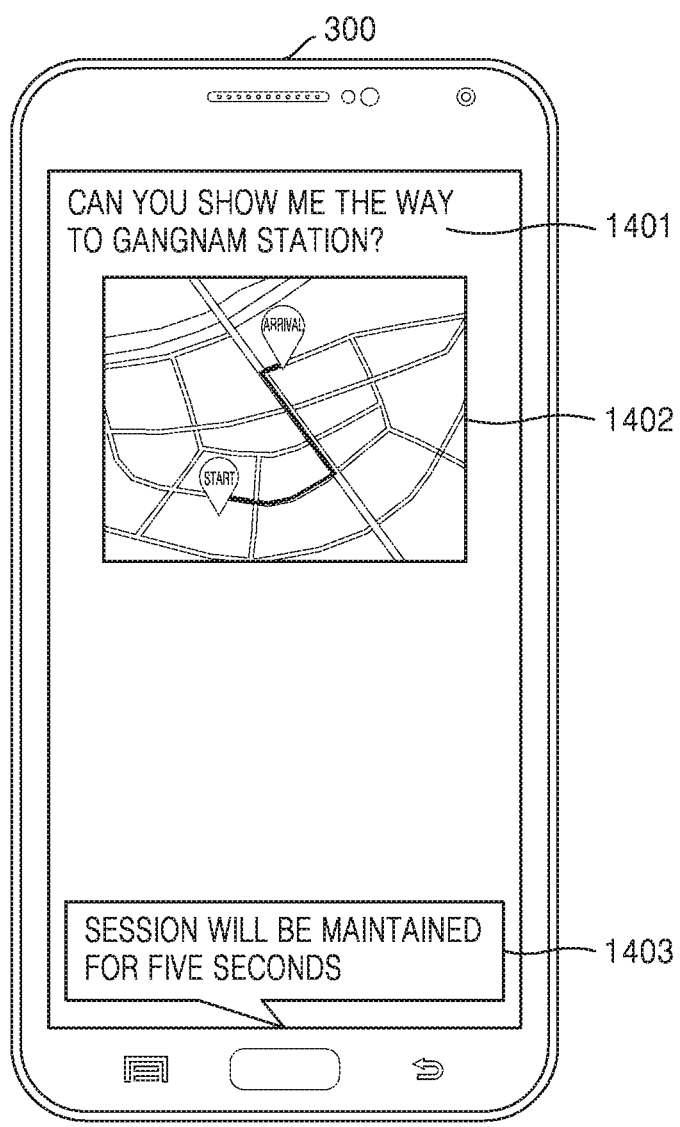
FIGS. 14A, 14B, and 14C illustrate another example in which a speech recognition apparatus outputs a result of speech recognition according to various embodiments of the present disclosure.
Figure 14B:
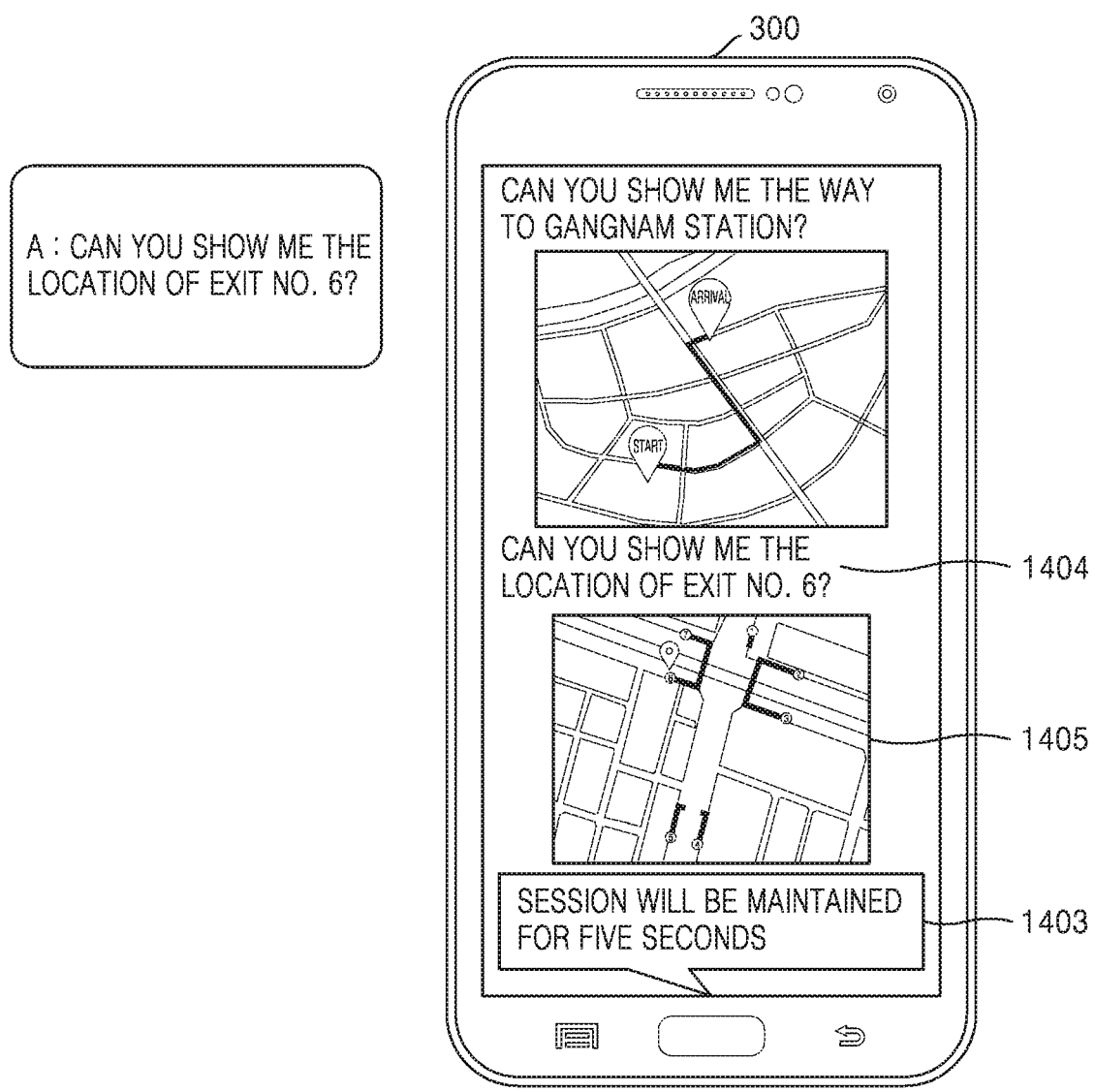
Figure 14C:
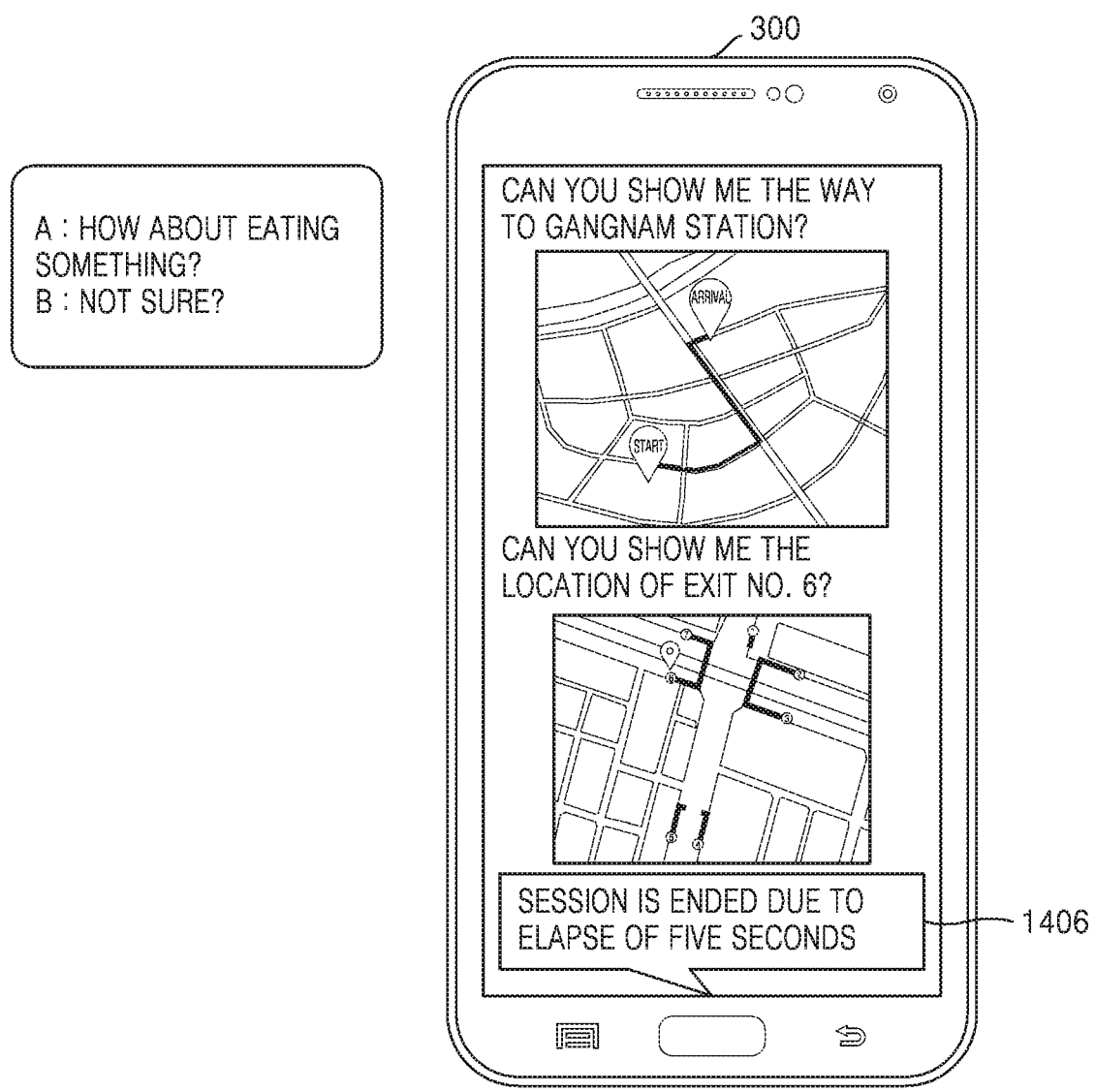

FIGS. 14A, 14B, and 14C illustrate another example in which a speech recognition apparatus outputs a result of speech recognition according to various embodiments of the present disclosure.

Referring to FIG. 14A, when a session is activated and a speaker A utters "Can you show me the way to Gangnam station?" for example, the speech recognition apparatus 300 may perform speech recognition on a detected first speech signal. The speech recognition apparatus 300 may determine that speaker A of the first speech signal is equal to a registered speaker A based on speaker information generated from the first speech signal. The speech recognition apparatus 300 may then reset the session to be maintained during a preset extended period based on a result of the determination.

In addition, the speech recognition apparatus 300 may output a result of the speech recognition based on the result of the determination. The speech recognition apparatus 300 may output, to the screen, a first text 1401 of "Can you show me the way to Gangnam station?" which is a result of performing the speech recognition from the detected first speech signal, and in response to a question of showing the way to Gangnam station, the speech recognition apparatus 300 may output, to the screen, information 1402 about the way to Gangnam station.

The speech recognition apparatus 300 may also output, to the screen, information 1403 indicating a set time for maintenance of the session.

Referring to FIG. 14B, when speaker A utters "Can you show me the location of Exit no. 6?" during maintenance of the session, the speech recognition apparatus 300 may perform speech recognition on a detected second speech signal. The speech recognition apparatus 300 may determine that speaker A of the second speech signal is equal to the registered speaker A based on speaker information generated from the second speech signal. The speech recognition apparatus 300 may then reset the session to be maintained during a preset extended period based on a result of the determination.

The speech recognition apparatus 300 may output, to the screen, text 1404 indicating "Can you show me the location of Exit no. 6?" which is a result of performing the speech recognition on the second speech signal based on the result of the determination that speaker A of the second speech signal is equal to the registered speaker A.

When too many pieces of information which correspond to the request of the second text 1404 and can be provided in regard to Exit no. 6 are found, the speech recognition apparatus 300 may compensate for the second text 1404. The speech recognition apparatus 300 may extract keywords "Gangnam station" from the first text 1401, and may compensate for the second text 1404 by using the extracted keywords. The speech recognition apparatus 300 may compensate for the second text 1404 and may generate a third text of "Can you show me the location of Exit no. 6 of Gangnam station?". In response to the third text, the speech recognition apparatus 300 may output information 1405 about the location of Exit no. 6 of Gangnam station to the screen in response to the third text. The speech recognition apparatus 300 may also output, to the screen, information 1403 indicating a set time for maintenance of the session.

FIG. 14C illustrates a case of a conversation in which speaker A asks a question of "How about eating something?" during maintenance of the session, and then a speaker B says "Not sure" as a reply.

The speech recognition apparatus 300 may detect a third speech signal including the question of "How about eating something?", and may perform speech recognition on the third speech signal. The speech recognition apparatus 300 may extract a fourth text of "How about eating something?" from the third speech signal.

The speech recognition apparatus 300 may determine that speaker A of the third speech signal is equal to the registered speaker A based on speaker information generated from the third speech signal.

The speech recognition apparatus 300 may determine, by performing natural language processing, whether the third speech signal was uttered by the speaker A for speech recognition. The speech recognition apparatus 300 may determine whether the speaker A uttered the third speech signal so as to perform speech recognition based on a correlation between previous texts (i.e., the first through third texts) and the fourth text.

Referring to FIG. 14C, the speech recognition apparatus 300 may determine that the correlation between the previous texts and the fourth text is smaller than a threshold value, and may determine that speaker A did not utter the third speech signal for speech recognition. The speech recognition apparatus 300 may then not output the fourth text extracted from the third speech signal based on a result of the determination.

The speech recognition apparatus 300 may maintain the session during only a remaining time of the session maintenance period based on the result of determining whether the third speech signal was uttered by speaker A for speech recognition, and after an elapse of the remaining time of the session maintenance period, the speech recognition apparatus 300 may maintain the setting by which the session is ended.

The speech recognition apparatus 300 may then detect a fourth speech signal including the reply of "Not sure" uttered by speaker B, and may perform speech recognition on the fourth speech signal.

The speech recognition apparatus 300 may determine that speaker B of the fourth speech signal is not equal to the registered speaker A based on speaker information generated from the fourth speech signal. The speech recognition apparatus 300 may then maintain the session during only a remaining time of the session maintenance period based on a result of the determination, and after an elapse of the remaining time of the session maintenance period, the speech recognition apparatus 300 may maintain the setting by which the session is ended. After the elapse of the session maintenance period, the speech recognition apparatus 300 may output, to the screen, information 1406 indicating an end of the session.

As described above with reference to FIGS. 4 and 5, a speech recognition system according to the present disclosure may include, but is not limited to, a speech recognition apparatus or a speech recognition server which can independently recognize and output speech. The speech recognition system may include the speech recognition apparatus and the speech recognition server. The speech recognition apparatus may be connected to the speech recognition server, may transmit information about input speech to the speech recognition server, may receive a result of speech recognition from the speech recognition server, and may output the result of speech recognition.

Figure 15:
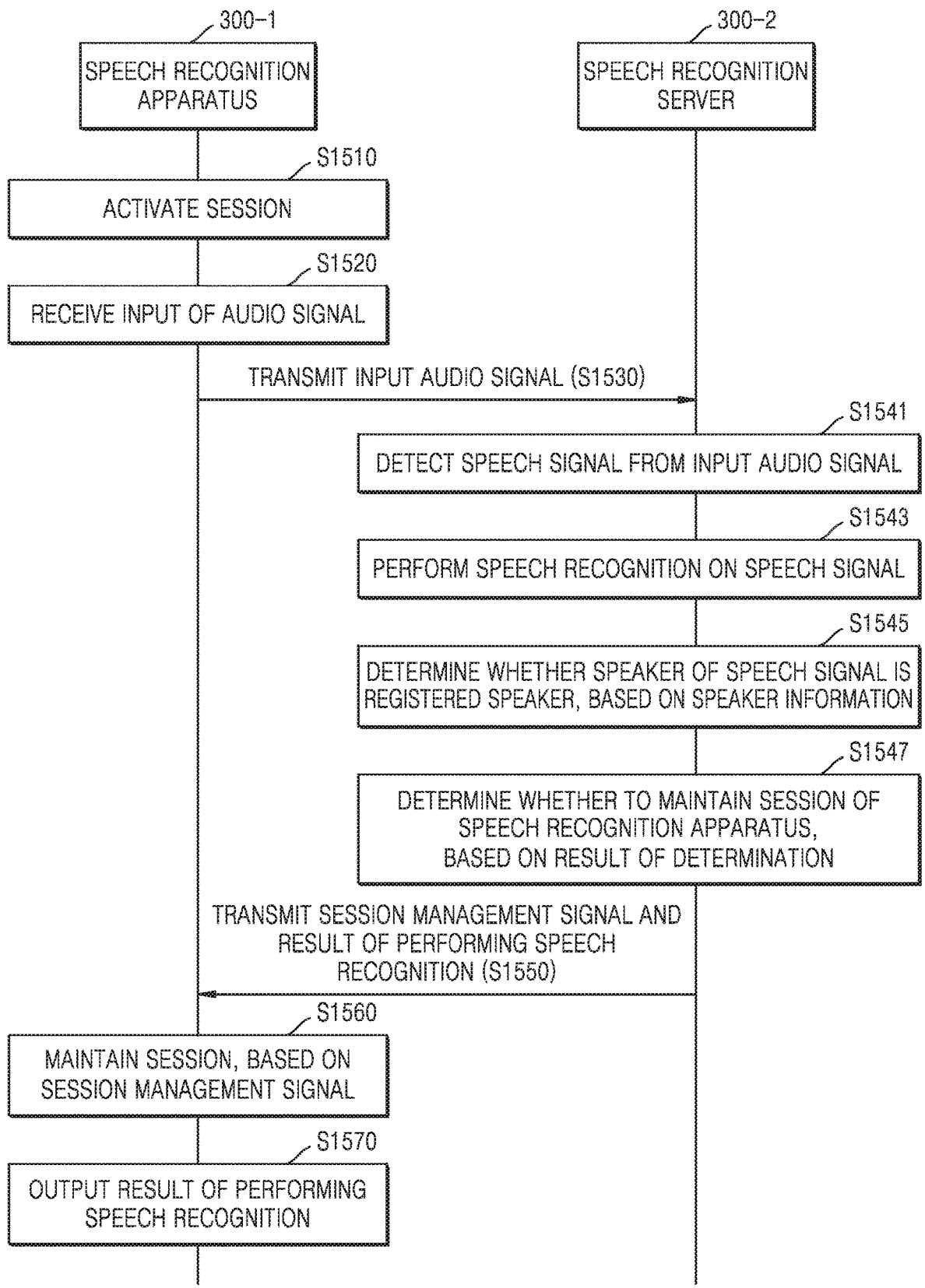
FIG. 15 is a flowchart of operations in a speech recognition system according to an embodiment of the present disclosure.

FIG. 15 is a flowchart of operations in a speech recognition system including a speech recognition apparatus and a speech recognition server according to an embodiment of the present disclosure.

Referring to FIG. 15, a speech recognition apparatus 300-1 and a speech recognition server 300-2 may respectively correspond to the speech recognition apparatus 231 and the speech recognition server 232 illustrated in FIG. 2C. As illustrated in FIG. 2C, the speech recognition apparatus and the speech recognition server may be connected to each other in a wireless or wired manner, and may exchange data.

In operation S1510, the speech recognition apparatus 300-1 may activate a session based on a user input. In operation S1520, the speech recognition apparatus 300-1 may receive an input of an audio signal during maintenance of the session, and in operation S1530, the speech recognition apparatus 300-1 may transmit the input audio signal to the speech recognition server 300-2.

In operation S1541, the speech recognition server 300-2 may receive the input audio signal from the speech recognition apparatus 300-1, and may detect a speech signal from the input audio signal. In operation S1543, the speech recognition server 300-2 may perform speech recognition on the detected speech signal, and in operation S1545, the speech recognition server 300-2 may determine whether a speaker of the speech signal is a registered speaker based on speaker information generated from the speech signal. In operation S1547, the speech recognition server 300-2 may determine whether to maintain the session of the speech recognition apparatus 300-1 based on a result of the determination.

In operation S1547, when the speech recognition server 300-2 determines that the speaker of the speech signal is the registered speaker, the speech recognition server 300-2 may maintain the session of the speech recognition apparatus 300-1. When the speech recognition server 300-2 determines that the speaker of the speech signal is the registered speaker, the speech recognition server 300-2 may maintain the session of the speech recognition apparatus 300-1 during a preset extended period. When the speech recognition server 300-2 determines that the speaker of the speech signal is not the registered speaker, after an elapse of a remaining time of a session maintenance period, the speech recognition server 300-2 may end the session of the speech recognition apparatus 300-1.

In operation S1550, when the speech recognition server 300-2 determines that the speaker of the speech signal is the registered speaker, the speech recognition server 300-2 may transmit a session management signal for maintaining the session and a result of performing the speech recognition to the speech recognition apparatus 300-1.

In operation S1560, the speech recognition apparatus 300-1 may maintain the session based on the received session management signal. In operation S1570, the speech recognition apparatus 300-1 may set the session to be maintained during the preset extended period and then ended after the extended period. The speech recognition apparatus 300-1 may then output the result of performing the speech recognition.

However, embodiments are not limited to what is illustrated in FIG. 15. Some of the operations in FIG. 15, such as the operations being performed by the speech recognition server 300-2, may be performed by the speech recognition apparatus 300-1.

For example, at least one of operations S1541 and S1543 may be performed by the speech recognition apparatus 300-1. The speech recognition apparatus 300-1 may detect the speech signal from the input audio signal, and may transmit the detected speech signal to the speech recognition server 300-2. Alternatively, the speech recognition apparatus 300-1 may transmit, to the speech recognition server 300-2, information related to a characteristic of the speech signal detected from the input audio signal.

As another example, at least one of operations S1545 and S1547 may be performed by the speech recognition apparatus 300-1. The speech recognition apparatus 300-1 may receive the result of the speech recognition from the speech recognition server 300-2, and may determine whether the speaker of the speech signal is the registered speaker. The speech recognition apparatus 300-1 may then determine whether to maintain the session based on a result of the determination.

Figure 16:
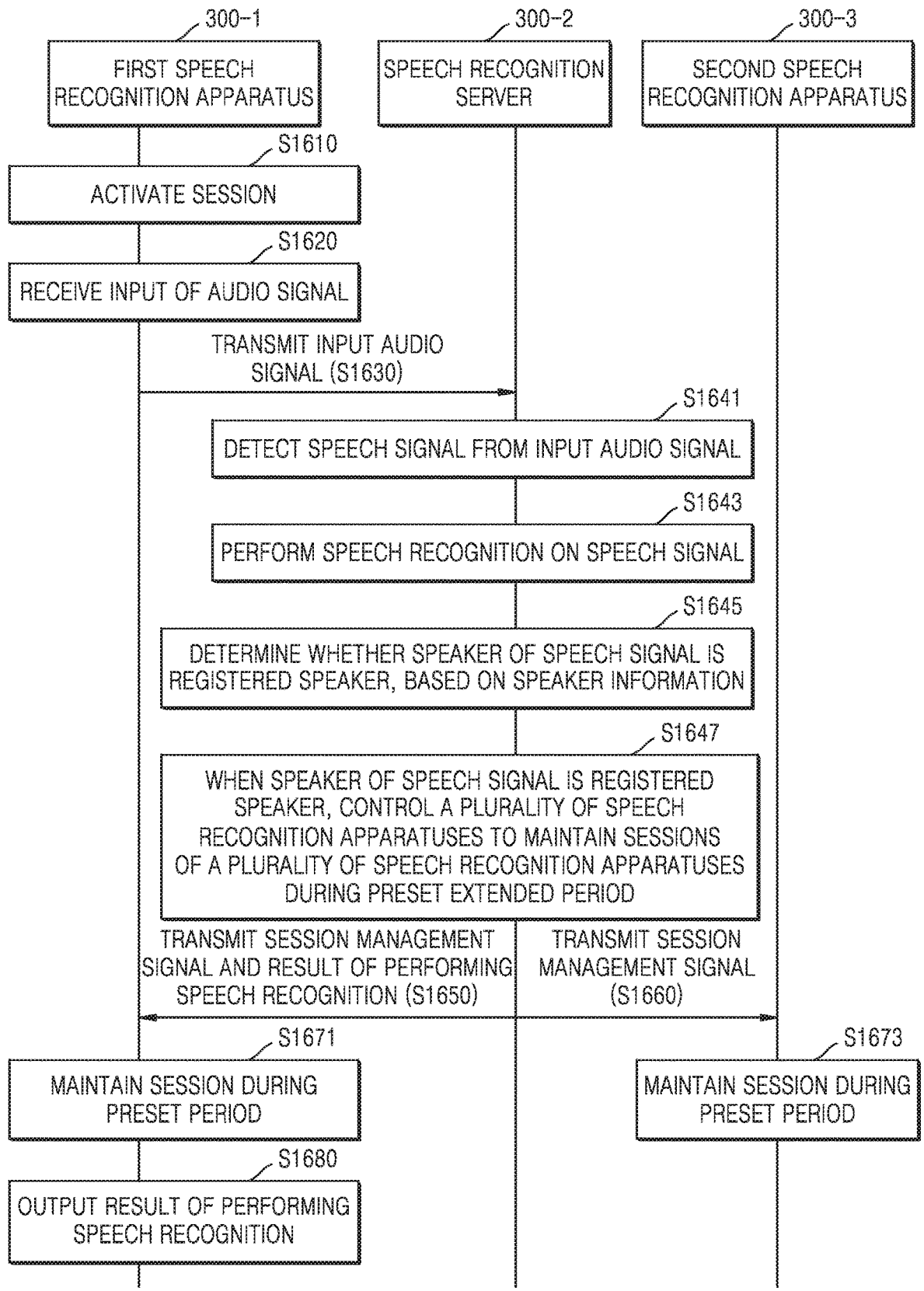
FIG. 16 is a flowchart of operations in a speech recognition system according to an embodiment of the present disclosure.

FIG. 16 is a flowchart of operations in a speech recognition system according to an embodiment of the present disclosure.

Referring to FIG. 16, a speech recognition system according to an embodiment may include a plurality of speech recognition apparatuses (hereinafter, referred to as first and second speech recognition apparatuses 300-1 and 300-3), and at least one speech recognition server 300-2. The first speech recognition apparatus 300-1 and the second speech recognition apparatus 300-3 may be remotely controlled through the speech recognition server 300-2 or may share data with each other.

In operation S1610, the first speech recognition apparatus 300-1 may activate a session based on a user input. In operation S1620, the first speech recognition apparatus 300-1 may receive an input of an audio signal during maintenance of the session, and in operation S1630, the first speech recognition apparatus 300-1 may transmit the input audio signal to the speech recognition server 300-2.

In operation S1641, the speech recognition server 300-2 may receive the input audio signal from the first speech recognition apparatus 300-1, and may detect a speech signal from the input audio signal. In operation S1643, the speech recognition server 300-2 may perform speech recognition on the detected speech signal. In operation S1645, the speech recognition server 300-2 may determine whether a speaker of the speech signal is a registered speaker based on speaker information generated from the speech signal.

The speech recognition server 300-2 may determine whether to maintain the session of the first speech recognition apparatus 300-1 based on a result of the determination in operation S1645. In operation S1647, when the speech recognition server 300-2 determines that the speaker of the speech signal is the registered speaker, the speech recognition server 300-2 may control the plurality of speech recognition apparatuses to maintain sessions of the plurality of speech recognition apparatuses during a preset extended period. When the speech recognition server 300-2 determines that the speaker of the speech signal is not the registered speaker, after an elapse of a remaining time of a session maintenance period, the speech recognition server 300-2 may end the session of the first speech recognition apparatus 300-1.

In operation S1650, when the speech recognition server 300-2 determines that the speaker of the speech signal is the registered speaker, the speech recognition server 300-2 may transmit a session management signal for maintaining the session and a result of performing the speech recognition to the first speech recognition apparatus 300-1. In operation S1660, when the speech recognition server 300-2 determines that the speaker of the speech signal is the registered speaker, the speech recognition server 300-2 may transmit a session management signal for activating and maintaining a session to the second speech recognition apparatus 300-3.

In operation S1671, the first speech recognition apparatus 300-1 may maintain the session based on the received session management signal. The first speech recognition apparatus 300-1 may set the session to be maintained during the preset extended period and then ended after the extended period. In operation S1680, the first speech recognition apparatus 300-1 may output the result of performing the speech recognition.

In operation S1673, the second speech recognition apparatus 300-3 may activate the session and may maintain the session during a preset period based on the received session management signal.

However, embodiments are not limited to what is illustrated in FIG. 16. Some of the operations in FIG. 16, such as the operations being performed by the speech recognition server 300-2, may be performed by at least one of the first speech recognition apparatus 300-1 and the second speech recognition apparatus 300-3.

For example, at least one of operations S1641 and S1643 may be performed by the first speech recognition apparatus 300-1. The first speech recognition apparatus 300-1 may detect the speech signal from the input audio signal, and may transmit the detected speech signal to the speech recognition server 300-2. Alternatively, the first speech recognition apparatus 300-1 may transmit, to the speech recognition server 300-2, information related to a characteristic of the speech signal detected from the input audio signal.

As another example, at least one of operations S1645 and S1647 may be performed by at least one of the first speech recognition apparatus 300-1 and the second speech recognition apparatus 300-3. At least one of the first speech recognition apparatus 300-1 and the second speech recognition apparatus 300-3 may receive the result of the speech recognition from the speech recognition server 300-2, and may determine whether the speaker of the speech signal is the registered speaker. At least one of the first speech recognition apparatus 300-1 and the second speech recognition apparatus 300-3 may then determine whether to maintain the session based on a result of the determination. At least one of the first speech recognition apparatus 300-1, the speech recognition server 300-2, and the second speech recognition apparatus 300-3 may transmit the session management signal and the result of performing the speech recognition to at least one of the first speech recognition apparatus 300-1, the speech recognition server 300-2, and the second speech recognition apparatus 300-3.

The operations in the speech recognition system according to the flowchart of FIG. 16 will now be described in detail with reference to FIGS. 17A and 17B.

Figure 17A:
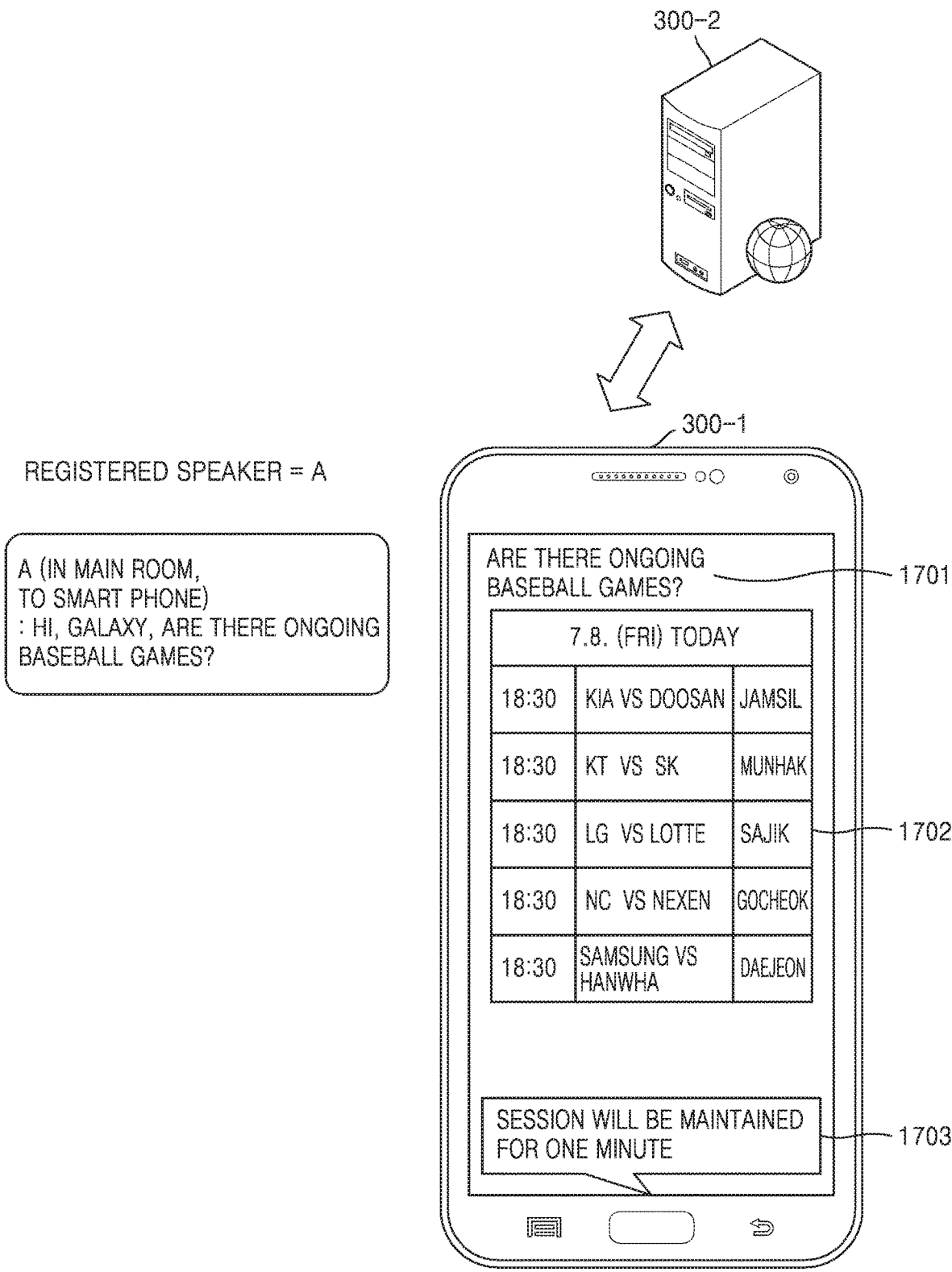
FIGS. 17A and 17B illustrate examples in which a speech recognition system outputs a result of speech recognition according to various embodiments of the present disclosure.
Figure 17B:
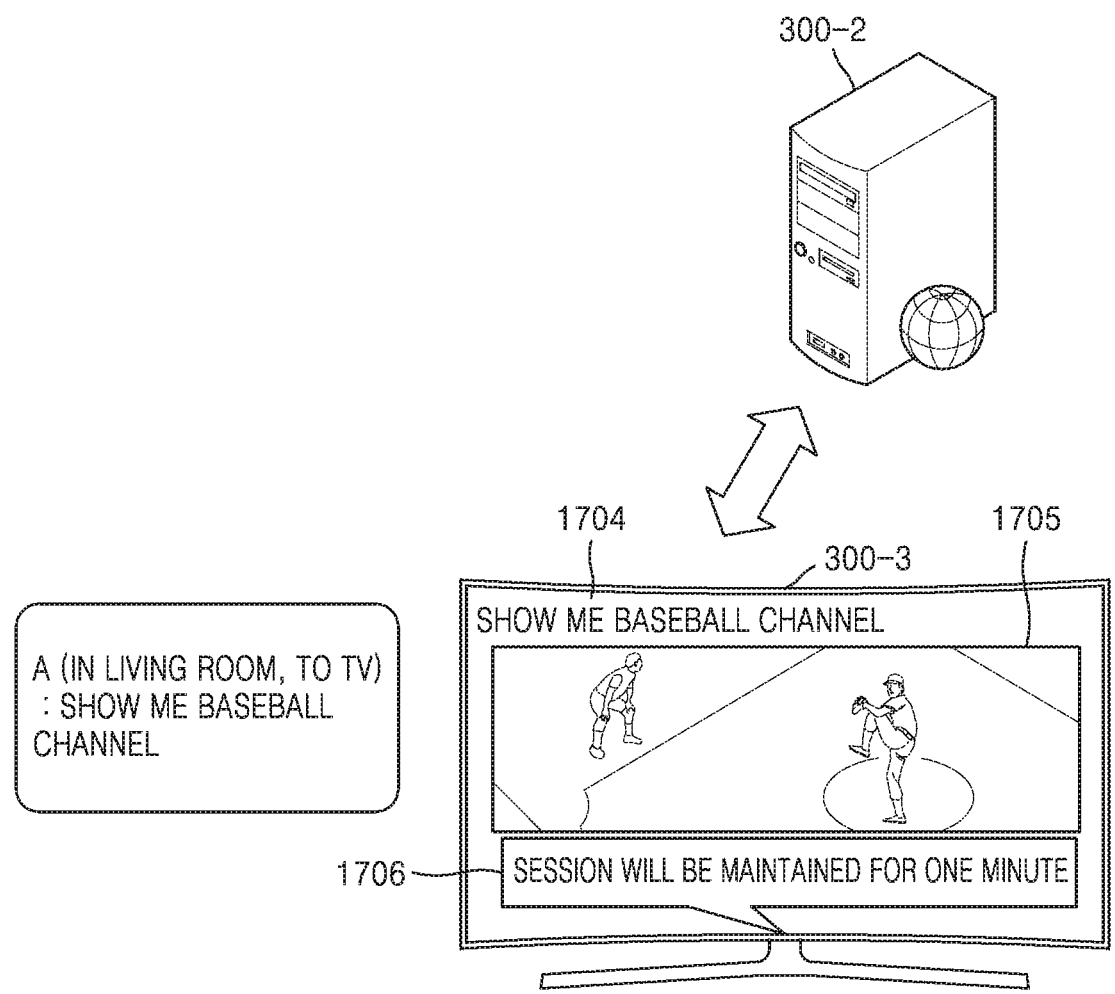

FIGS. 17A and 17B illustrate examples in which a speech recognition system outputs a result of speech recognition according to various embodiments of the present disclosure.

FIGS. 17A and 17B illustrate examples in which the first speech recognition apparatus 300-1 is a smartphone, and the second speech recognition apparatus 300-3 is a smart TV. The first speech recognition apparatus 300-1 and the second speech recognition apparatus 300-3 may be connected to a speech recognition server in a wired or wireless manner. The speech recognition system illustrated in FIGS. 17A and 17B may be a part of a home network system.

Referring to FIG. 17A, when a speaker A in a main room utters "Hi, Galaxy, are there ongoing baseball games?" for example, the first speech recognition apparatus 300-1 may activate a session based on a pre-stored call keyword of "Hi, Galaxy", and may transmit a received input audio signal to the speech recognition server 300-2. The speech recognition server 300-2 may then perform speech recognition on a detected first speech signal. The speech recognition server 300-2 may determine that speaker A of the first speech signal is equal to a registered speaker A based on speaker information generated from the first speech signal.

The speech recognition server 300-2 may then output a result of the speech recognition to the first speech recognition apparatus 300-1 based on a result of the determination. The first speech recognition apparatus 300-1 may output, to a screen, text 1701 of "Are there ongoing baseball games?" which is the result of performing the speech recognition from the detected first speech signal, and may output, to the screen, information 1702 about ongoing baseball games in response to the question of "Are there ongoing baseball games?".

The speech recognition server 300-2 may control the session of the first speech recognition apparatus 300-1 to be maintained during a preset extended period based on a result of the determination. In addition, the speech recognition server 300-2 may control both the first speech recognition apparatus 300-1 and a session of the second speech recognition apparatus 300-3 shown in FIG. 17B, which is also connected to the speech recognition server 300-2, to be activated and maintained during the preset extended period. The first speech recognition apparatus 300-1 and the second speech recognition apparatus 300-3 may respectively output, to one or more displays or screens, two pieces of information 1703 and 1706 indicating a reset time for maintenance of the session.

While the session of the second speech recognition apparatus 300-3 is activated and maintained, speaker A may move from the main room to a living room, and may utter "Show me baseball channel" to the second speech recognition apparatus 300-3 positioned in the living room. Thus, after speaker A uttered a speech recognition command with respect to the first speech recognition apparatus 300-1, the speaker A does not have to perform an operation of activating a session of the second speech recognition apparatus 300-3 so as to utter a speech recognition command with respect to the second speech recognition apparatus 300-3.

The second speech recognition apparatus 300-3 may transmit an input audio signal including the utterance of "Show me baseball channel" to the speech recognition server 300-2. The speech recognition server 300-2 may then perform speech recognition on a detected second speech signal. The speech recognition server 300-2 may determine that speaker A of the second speech signal is equal to the registered speaker A based on speaker information generated from the second speech signal.

The speech recognition server 300-2 may output a result of the speech recognition to the second speech recognition apparatus 300-3 based on a result of the determination. The second speech recognition apparatus 300-3 may output, to the screen, text 1704 of "Show me baseball channel" which is the result of performing the speech recognition from the detected second speech signal. The second speech recognition apparatus 300-3 may also change channels to a channel 1705 that broadcasts a baseball game.

In the examples of FIGS. 17A and 17B, only speaker A who is the registered speaker utters speech, but embodiments are not limited thereto and thus, a plurality of speakers may be previously registered in the speech recognition system, and the speech recognition system may store a plurality of pieces of information about the plurality of registered speakers.

When at least one of the plurality of registered speakers continuously utters speech with respect to at least one of a plurality of speech recognition apparatuses, sessions of the plurality of speech recognition apparatuses may be maintained without an operation of separately activating the sessions. The plurality of speech recognition apparatuses may manage the sessions together and may output a same result of speech recognition. Alternatively, the plurality of speech recognition apparatuses may manage the sessions together and may separately output a result of speech recognition according to each speaker.

For example, when speaker A and a speaker B are both registered speakers and, instead of speaker A, speaker B utters "Show me baseball channel" in the example of FIG. 17B, the speech recognition apparatus 300 may output, in a serial or parallel manner, the result of speech recognition with respect to the utterance of speaker A and the result of speech recognition with respect to the utterance of speaker B.

For example, the first speech recognition apparatus 300-1 and the second speech recognition apparatus 300-3 may sequentially output the result of speech recognition with respect to the utterance of speaker A and the result of speech recognition with respect to the utterance of speaker B.

While the sessions of the first speech recognition apparatus 300-1 and the second speech recognition apparatus 300-3 are activated and maintained, the first speech recognition apparatus 300-1 may receive, from speaker A, the utterance of "Are there ongoing baseball games?". The first speech recognition apparatus 300-1 and the second speech recognition apparatus 300-3 may output, to the screen, text of "Are there ongoing baseball games?" which is a result of performing the speech recognition from a speech signal of speaker A, and may output, to the screens, information about ongoing baseball games in response to the question of "Are there ongoing baseball games?".

While the sessions of the first speech recognition apparatus 300-1 and the second speech recognition apparatus 300-3 are activated and maintained, the second speech recognition apparatus 300-3 may receive, from speaker B, the utterance of "Show me baseball channel". The first speech recognition apparatus 300-1 and the second speech recognition apparatus 300-3 may output, to the screen, text of "Show me baseball channel" which is a result of performing the speech recognition from a speech signal of speaker B. The first speech recognition apparatus 300-1 and the second speech recognition apparatus 300-3 may also change channels to a channel that broadcasts a baseball game in response to a request of showing baseball games.

As another example, the first speech recognition apparatus 300-1 and the second speech recognition apparatus 300-3 may output, in a parallel manner, the result of speech recognition with respect to the utterance of speaker A and the result of speech recognition with respect to the utterance of speaker B.

The first speech recognition apparatus 300-1 may receive, from speaker A, the utterance of "Are there ongoing baseball games?", and may output the result of performing the speech recognition from the speech signal of speaker A. The second speech recognition apparatus 300-3 may receive, from speaker B, the utterance of "Show me baseball channel", and may output the result of performing the speech recognition from the speech signal of speaker B. That is, the first speech recognition apparatus 300-1 and the second speech recognition apparatus 300-3 may manage the sessions together, but may separately output the results of speech recognition.

Referring to FIGS. 16, 17A, and 17B, the speech recognition system according to an embodiment may determine whether to maintain sessions of a plurality of speech recognition apparatuses in a house, based on speaker recognition, so that it is convenient for a user to input a speech recognition command without separately performing an operation of activating a session. Thus, when the user inputs a speech recognition command with respect to two or more Internet of things (IoT) devices included in a home network system, the user may seamlessly input the speech recognition command with respect to the two or more IoT devices even in different places by using the speech recognition system according to an embodiment.

As described above, in the speech recognition system according to one or more embodiments, only a result of speech recognition with respect to utterance of a registered speaker is output via speaker verification, so that personalization of speech recognition is possible in a personalized apparatus such as a smartphone. In addition, in the speech recognition system according to one or more embodiments, the number of times that a user unnecessarily activates a session is decreased, so that user convenience in using the speech recognition system may be increased. In addition, in the speech recognition system according to one or more embodiments, personalized speech recognition may be possible for a user who considers personal information protection as important.

In these and other examples, the one or more embodiments of the present disclosure can be written as computer programs and can be implemented in general-use digital computers that execute the programs using a non-transitory, computer-readable recording medium. In addition, a data structure used in embodiments of the present disclosure can be written in a non-transitory, computer-readable recording medium through various means. The one or more embodiments may be embodied as computer readable code/instructions on a recording medium, e.g., a program module to be executed in computers, which include computer-readable commands. For example, methods that are implemented as software modules or algorithms may be stored as computer readable codes or program instructions executable on a non-transitory, computer-readable recording medium.

The computer-readable medium may include any recording medium that may be accessed by computers, including but not limited to volatile and non-volatile medium, and detachable and non-detachable medium. Examples of the computer-readable medium include, but are not limited to, magnetic storage media (e.g., read-only memory (ROM), floppy disks, hard disks, and the like), optical recording media (e.g., compact disc-ROM (CD-ROMs), or digital versatile disc (DVDs)), and the like. In addition, the computer-readable medium may include a computer storage medium and a communication medium.

The non-transitory, computer-readable recording media can be distributed over network coupled computer systems, and data stored in the distributed recording media, e.g., a program command and code, may be executed by using at least one computer.

Throughout the specification, the term "unit", "module", and the like, may indicate a hardware component such as a processor or a circuit, and/or may indicate a software component that is executed by a hardware configuration such as a processor.

For example, "unit" or "module" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

It will be obvious to one of ordinary skill in the art that the present disclosure may be easily embodied in many different forms without changing the technical concept or essential features of the disclosure. Thus, it should be understood that the embodiments described herein should be considered in a descriptive sense only, and not for purposes of limitation. For example, configuring elements that are singular forms may be executed in a distributed fashion and also, configuring elements that are distributed may be combined and then executed.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method of speech recognition, the method comprising:
   activating, by an electronic device, a session for receiving a first audio signal based on a user input;
   performing, by the electronic device, first speech recognition on a first speech signal detected from the first audio signal while the session is maintained;
   determining, by the electronic device, whether a speaker of the first speech signal is a registered speaker based on speaker information obtained from the first speech signal;
   determining, by the electronic device, whether to maintain the session based on a result of the determination of whether the speaker of the first speech signal is a registered speaker;
   outputting, by the electronic device, a result of the first speech recognition;
   receiving, by the electronic device, a second audio signal while the session is maintained;
   performing, by the electronic device, second speech recognition on a second speech signal detected from the second audio signal while the session is maintained;
   obtaining, by the electronic device, a correlation between a meaning of the first speech signal and a meaning of the second speech signal; and
   outputting, by the electronic device, a result of the second speech recognition based on the obtained correlation,
   wherein an operation of the receiving the input of an audio signal is performed according to whether the session is currently activated.

2. The method of claim 1, wherein the determining of whether to maintain the session comprises:
   maintaining the session when the speaker of the first speech signal is the registered speaker; and
   ending the session when the speaker of the first speech signal is not the registered speaker.

3. The method of claim 1,
   wherein the activating of the session comprises setting the session to be maintained during a session maintenance period and then to be ended after the session maintenance period, and
   wherein the determining of whether to maintain the session comprises resetting the session to be maintained during a preset extended period and then to be ended after the preset extended period when the speaker of the first speech signal is the registered speaker.

4. The method of claim 1, wherein the outputting of the result comprises outputting the result of the first speech recognition when the speaker of the first speech signal is the registered speaker.

5. The method of claim 1, wherein the performing of the speech recognition comprises:
   extracting, from the first speech signal, a speech recognition feature vector for robust speech recognition, and a speaker recognition feature vector for robust speaker recognition;
   generating the result of the first speech recognition by performing the first speech recognition on the first speech recognition feature vector; and
   generating the speaker information by using the speaker recognition feature vector.

6. The method of claim 5,
wherein the generating of the result of the first speech recognition by performing the first speech recognition on the speech recognition feature vector is based on at least one of an acoustic model or a language model, and
wherein the generating of the speaker information comprises:
- extracting states posteriors based on at least one of the acoustic model or the speech recognition feature vector; and
- generating the speaker information by using the states posteriors and the speaker recognition feature vector.

7. The method of claim 1, wherein the performing of the speech recognition comprises:
- segmenting the first audio signal that is input in real-time into frame units each having a preset length;
- detecting the speech signal in the frame units comprising a first frame by processing the segmented first audio signal;
- performing the speech recognition on the first frame of the first speech signal;
- generating speaker information of the first frame by using states posteriors with respect to the first frame, wherein the states posteriors are extracted while the first speech recognition is performed on the first frame;
- repeating operations of the first speech recognition on each of the frame units of the first speech signal, wherein the frame units are sequentially detected from the first audio signal that is input in real-time; and
- generating the speaker information.

8. The method of claim 1, wherein the determining of whether the speaker of the first speech signal is the registered speaker comprises:
- calculating a similarity between the speaker information and pre-stored registered speaker information about the registered speaker; and
- determining whether the speaker of the first speech signal is the registered speaker based on a result of comparing the similarity with a preset threshold value.

9. The method of claim 8, further comprising, when the speaker of the first speech signal is the registered speaker, updating, by the electronic device, the registered speaker information by performing adaptation training using the speaker information.

10. The method of claim 1, wherein the outputting of the result comprises:
- performing natural language processing on a result of performing speech recognition on a previous speech signal detected during the session and a result of performing the speech recognition on the first speech signal;
- determining whether the first speech signal was uttered by the speaker for speech recognition based on the natural language processing; and
- outputting the result of the first speech recognition based on a result of determining that the first speech signal was uttered by the speaker for speech recognition.

11. An apparatus for speech recognition, the apparatus comprising:
- a receiver configured to receive a first audio signal while a session for receiving an input of one or more audio signals is maintained when the session is activated based on a user input;
- at least one processor;
- at least one memory storing one or more computer programs configured to executed by the at least one processor, wherein the one or more computer programs include instructions to at least:
  - detect a first speech signal from the first audio signal,
  - perform first speech recognition on the first speech signal,
  - determine whether a speaker of the first speech signal is a registered speaker based on speaker information obtained from the first speech signal,
  - determine whether to maintain the session based on a result of the determination of whether the speaker of the first speech signal is a registered speaker, and
  - output a result of the first speech recognition,
  - receive a second audio signal while the session is maintained,
  - perform second speech recognition on a second speech signal detected from the second audio signal while the session is maintained,
  - obtain a correlation between a meaning of the first speech signal and a meaning of the second speech signal of the second speech signal; and
- an output unit configured to output a result of the second speech recognition based on the obtained correlation,
wherein an operation of the receiving the input of an audio signal is performed according to whether the session is currently maintained.

12. The apparatus of claim 11, wherein the one or more computer programs further include instructions to:
- maintain the session when the speaker of the first speech signal is the registered speaker, and
- end the session when the speaker of the first speech signal is not the registered speaker.

13. The apparatus of claim 11, wherein the one or more computer programs further include instructions to:
- set, before the receiver receives the input audio signal, the session to be maintained during a session maintenance period and then ended after the session maintenance period, and
- reset, when the processor determines to maintain the session, the session to be maintained during a preset extended period when the speaker of the first speech signal is the registered speaker and then ended after the preset extended period.

14. The apparatus of claim 11, wherein, when the speaker of the first speech signal is the registered speaker, the processor is further configured to control the output unit to output the result of the first speech recognition.

15. The apparatus of claim 11, wherein the one or more computer programs further include instructions to:
- extract, from the first speech signal, a speech recognition feature vector for robust speech recognition and a speaker recognition feature vector for robust speaker recognition,
- perform the first speech recognition on the speech recognition feature vector based on at least one of an acoustic model or a language model,
- extract states posteriors based on at least one of the acoustic model and the speech recognition feature vector, and
- generate the speaker information by using the states posteriors and the speaker recognition feature vector.

16. The apparatus of claim 11, wherein the one or more computer programs further include instructions to:
- segment the first audio signal that is input in real-time into frame units each having a preset length,
- detect the first speech signal in the frame units comprising a first frame by processing the segmented audio signal, perform the speech recognition on the first frame of the first speech signal, generate speaker information of the first frame by using states posteriors with respect to the first frame, wherein the states posteriors are extracted while the first speech recognition is performed on the first frame, repeat operations of performing the first speech recognition on each of the frame units of the first speech signal, wherein the frame units are sequentially detected from the first audio signal that is input in real-time, and generate the speaker information.

17. The apparatus of claim 11, wherein the one or more computer programs further include instructions to:

calculate, when the processor determines whether the speaker of the first speech signal is the registered speaker, a similarity between the speaker information and pre-stored registered speaker information about the registered speaker, determine whether the speaker of the first speech signal is the registered speaker based on a result of comparing the similarity with a preset threshold value, and update, when the speaker of the first speech signal is the registered speaker, the registered speaker information by performing adaptation training using the speaker information.

18. The apparatus of claim 11, wherein the one or more computer programs further include instructions to:

perform natural language processing on a result of performing speech recognition on a previous speech signal detected during the session and a result of performing the speech recognition on the first speech signal, determine whether the first speech signal was uttered by the speaker for speech recognition based on the natural language processing, and output the result of the first speech recognition based on a result of determining that the first speech signal was uttered by the speaker for speech recognition.

19. A non-transitory, computer-readable recording medium having recorded thereon at least one program comprising instructions that, when executed by at least one processor, configure the instructions to execute a speech recognition method by:

activating, by an electronic device, a session for receiving a first audio signal based on a user input;

performing, by the electronic device, first speech recognition on a first speech signal detected from the first audio signal while the session is maintained;

determining, by the electronic device, whether a speaker of the first speech signal is a registered speaker based on speaker information obtained from the first speech signal;

determining, by the electronic device, whether to maintain the session based on a result of the determination of whether the speaker of the first speech signal is a registered speaker;

outputting, by the electronic device, a result of the first speech recognition;

receiving, by the electronic device, a second audio signal while the session is maintained;

performing, by the electronic device, second speech recognition on a second speech signal detected from the second audio signal while the session is maintained;

obtaining, by the electronic device, a correlation between a meaning of the first speech signal and a meaning of the second speech signal; and outputting, by the electronic device, a result of the second speech recognition based on the obtained correlation, wherein an operation of the receiving the input of an audio signal is performed according to whether the session is currently activated.

20. The method of claim 1, further comprising calculating, by the electronic device, a vector matrix including the speaker information by using one or more of total variability conversion information, a universal background model, a speech recognition feature vector, and states posteriors.

21. The method of claim 1, further comprising comparing the calculated correlation with a predetermined threshold value, thereby determining whether the speaker has uttered the first speech signal so as to perform the first speech recognition.

* * * * *